(12) United States Patent
Wang et al.

(10) Patent No.: US 12,085,840 B2
(45) Date of Patent: Sep. 10, 2024

(54) CAMERA ASSEMBLY AND ELECTRONIC DEVICE

(71) Applicant: HUAWEI TECHNOLOGIES CO., LTD., GuangDong (CN)

(72) Inventors: Sen Wang, Shenzhen (CN); Jian Shi, Shanghai (CN); Zhi Yuan, Shanghai (CN); Weidong Tang, Shenzhen (CN); Along Zhou, Yokohama (JP); Chenhan Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 68 days.

(21) Appl. No.: 17/871,533

(22) Filed: Jul. 22, 2022

(65) Prior Publication Data
US 2022/0357636 A1  Nov. 10, 2022

Related U.S. Application Data

(63) Continuation of application No. PCT/CN2021/070785, filed on Jan. 8, 2021.

(30) Foreign Application Priority Data

Jan. 22, 2020 (CN) .......................... 202010075892.7

(51) Int. Cl.
*G03B 17/55* (2021.01)
*G03B 30/00* (2021.01)
(Continued)

(52) U.S. Cl.
CPC ............. *G03B 17/55* (2013.01); *G03B 30/00* (2021.01); *H04N 23/52* (2023.01); *H04N 23/54* (2023.01); *H04N 23/55* (2023.01)

(58) Field of Classification Search
None
See application file for complete search history.

(56) References Cited

U.S. PATENT DOCUMENTS

| 9,386,200 B2 | 7/2016 | Hongo | |
| 9,664,562 B1 * | 5/2017 | Goodnough | .......... G01J 3/0289 |

(Continued)

FOREIGN PATENT DOCUMENTS

| CN | 102201756 A | 9/2011 |
| CN | 102243416 A | 11/2011 |

(Continued)

*Primary Examiner* — Mark T Monk
(74) *Attorney, Agent, or Firm* — Rimon PC

(57) ABSTRACT

A camera assembly is provided. The camera assembly includes an auxiliary mount, a rotatable camera module and a flexible heat conducting assembly, the rotatable camera module includes a rotatable mount and a camera function group disposed on the rotatable mount, the rotatable mount is rotatably connected to the auxiliary mount, the flexible heat conducting assembly is fixedly connected to one end of the camera function group, and the flexible heat conducting assembly is further configured to be connected to a non-rotatable camera module component, so that heat generated by the camera function group is transferred to the non-rotatable camera module component. A flexible heat conducting assembly performs a cross-region transfer of heat generated by the rotatable camera module, to help reduce an ambient temperature of the rotatable camera module, so as to improve photography quality of the camera module, and prolong a photography time period of the rotatable camera module.

20 Claims, 19 Drawing Sheets

(51) Int. Cl.
   *H04N 23/52*   (2023.01)
   *H04N 23/54*   (2023.01)
   *H04N 23/55*   (2023.01)

(56) References Cited

U.S. PATENT DOCUMENTS

| | | |
|---|---|---|
| 2008/0198556 A1 | 8/2008 | Iwata et al. |
| 2015/0070565 A1 | 3/2015 | Furusawa et al. |
| 2017/0330979 A1 | 11/2017 | Huang et al. |
| 2018/0013934 A1 | 1/2018 | Germe et al. |
| 2019/0018258 A1 | 1/2019 | Minamisawa et al. |
| 2019/0020799 A1 | 1/2019 | Minamisawa et al. |
| 2019/0140112 A1 | 5/2019 | Huang et al. |

FOREIGN PATENT DOCUMENTS

| | | |
|---|---|---|
| CN | 102859986 A | 1/2013 |
| CN | 104580855 A | 4/2015 |
| CN | 105052121 A | 11/2015 |
| CN | 107135346 A | 9/2017 |
| CN | 207782931 U | 8/2018 |
| CN | 108924393 A | 11/2018 |
| CN | 109975973 A | 7/2019 |
| CN | 110007543 A | 7/2019 |
| CN | 209417503 U | 9/2019 |
| EP | 3457679 A1 | 3/2019 |

\* cited by examiner

CAMERA ASSEMBLY AND ELECTRONIC DEVICE

CROSS-REFERENCE TO RELATED APPLICATIONS

This application is a continuation of International Application No. PCT/CN2021/070785, filed on Jan. 8, 2021, which claims priority to Chinese Patent Application No. 202010075892.7, filed on Jan. 22, 2020. The disclosures of the aforementioned applications are hereby incorporated by reference in their entireties.

TECHNICAL FIELD

This application relates to the field of photography technologies, and in particular, to a camera assembly and an electronic device.

BACKGROUND

Nowadays, photography performance is one of the important factors used by consumers to select consumer electronic devices. An electronic device is equipped with a rotatable camera module to provide stabilization over a large angle. However, when the camera module rotates, one end of a bottom of the camera module is suspended. Consequently, the bottom is surrounded by air, and heat dissipation from the camera module is hindered. When a temperature of an element (for example, an image sensor or a lens) in the camera module is very high, photography performance, for example, focusing speed, image resolution, or image noise, of the electronic device can be significantly affected.

SUMMARY

A technical problem to be resolved in this application is to provide a camera assembly and an electronic device that can be used to improve heat dissipation performance.

To achieve the foregoing objective, the following technical solutions are used in implementations of this application:

According to a first aspect of this application, a camera assembly is provided, including an auxiliary mount, a rotatable camera module, and a flexible heat conducting assembly. The rotatable camera module is disposed on the auxiliary mount, the rotatable camera module includes a rotatable mount and a camera function group disposed on the rotatable mount, the rotatable mount is rotatably connected to the auxiliary mount, the flexible heat conducting assembly is fixedly connected to one end of the camera function group, and the flexible heat conducting assembly is further configured to be connected to a non-rotatable camera module component, so that heat generated by the camera function group is transferred to the non-rotatable camera module component.

In the first aspect of this application, the non-rotatable camera module component is a component other than the rotatable camera module, for example, the auxiliary mount, a main circuit board of an electronic device, or a main mount of the electronic device. The flexible heat conducting assembly is fixedly connected to the camera function group, and the flexible heat conducting assembly is further configured to be connected to the non-rotatable camera module component, so that the heat generated by the rotatable camera module is conducted to the non-rotatable camera module component. In other words, the heat generated by the rotatable camera module is transferred from a region in which the rotatable camera module is located to another region, to implement a cross-region heat transfer, and help reduce an ambient temperature of the rotatable camera module. Therefore, quality of an image shot by the rotatable camera module is improved, and a photography time period of the rotatable camera module is prolonged. Because of flexibility of the flexible heat conducting assembly, no interference is caused to the rotation of the camera function group relative to the auxiliary mount.

According to the first aspect, in a first possible implementation of the first aspect, the camera function group includes a lens module, a drive component, a drive circuit board, a reinforcement component, and an image sensor, the lens module is disposed on the rotatable mount, the drive component is configured to drive the rotatable mount to rotate relative to the auxiliary mount, the drive circuit board is fastened at one end of the lens module, the image sensor is disposed on one side of the drive circuit board and that faces the lens module, the reinforcement component is disposed on one side of the drive circuit board and that is away from the lens module, and the flexible heat conducting assembly is fixedly connected to the reinforcement component. The reinforcement component can be used to effectively strengthen the strength of the drive circuit board. The drive circuit board, the reinforcement component, the flexible heat conducting assembly, and the non-rotatable camera module component connected to the flexible heat conducting assembly form a heat conduction channel, so that heat generated by the image sensor is transferred to the non-rotatable camera module component, to effectively reduce both a temperature of the image sensor and a temperature of the lens module. Therefore, photography performance and photography efficiency of the rotatable camera module are improved.

According to the first aspect or the first possible implementation of the first aspect, in a second possible implementation of the first aspect, the auxiliary mount includes a body and a partition part protruding from one side of the body, the body forms an accommodation space, the partition part partitions the accommodation space into a first accommodation part and a second accommodation part, the rotatable camera module is accommodated in the first accommodation part, the camera assembly further includes a fastened module fixedly accommodated in the second accommodation part, and the fastened module is a fastened camera module or an auxiliary camera module. The rotatable camera module is accommodated in the first accommodation part obtained through partition performed by using the partition part, so that an impact of heat generated by another module on the rotatable camera module can be effectively avoided. In addition, the fastened module and the rotatable camera module cooperate with each other, to effectively improve the photography quality of the camera assembly.

According to the first aspect or the first and the second possible implementations of the first aspect, in a third possible implementation of the first aspect, the flexible heat conducting assembly partially extends to the fastened module and is attached to the fastened module, to transfer heat of the rotatable camera module to the fastened module, and effectively reduce a temperature of the rotatable camera module.

According to the first aspect or the first to the third possible implementations of the first aspect, in a fourth possible implementation of the first aspect, the flexible heat conducting assembly partially extends towards the partition part and is attached to the partition part, so that the heat generated by the rotatable camera module is transferred from the region in which the rotatable camera module is located to the auxiliary mount. In other words, the flexible heat conducting assembly and the auxiliary mount form a heat conduction channel, to improve heat dissipation efficiency of the rotatable camera module.

According to the first aspect or the first to the fourth possible implementations of the first aspect, in a fifth possible implementation of the first aspect, the partition part includes a first mounting section and a second mounting section, one end of the first mounting section is fixedly connected to the body, the second mounting section is formed by bending and extending the other end of the first mounting section and is fixedly connected to the body, the first accommodation part is surrounded by the body and the first mounting section, the second accommodation part is jointly surrounded by the body, the first mounting section, and the second mounting section, and the flexible heat conducting assembly is attached to the second mounting section, to help increase a contact area of the partition part and the flexible heat conducting assembly, so as to improve heat conduction efficiency of the flexible heat conducting assembly.

According to the first aspect or the first to the fifth possible implementations of the first aspect, in a sixth possible implementation of the first aspect, the camera assembly further includes a connector and a flexible circuit board, the flexible heat conducting assembly is attached to the flexible circuit board, one end of the flexible circuit board is electrically connected to the rotatable camera module, one end of the flexible circuit board and that is away from the rotatable camera module is fixedly and electrically connected to the connector, and the connector is configured to be fixedly and electrically connected to a circuit board of an electronic device. The flexible heat conducting assembly conducts a heat part of the rotatable camera module to the flexible circuit board, to improve efficiency of a cross-region heat transfer performed by the camera assembly on the rotatable camera module.

According to the first aspect or the first to the sixth possible implementations of the first aspect, in a seventh possible implementation of the first aspect, the flexible heat conducting assembly is partially exposed from the flexible circuit board, and is configured to be fixedly connected to a shielding cover of a main circuit board of the electronic device. In other words, the flexible heat conducting assembly and the shielding cover also form a heat conduction path, to further improve efficiency of a cross-region heat transfer performed by the camera assembly on the rotatable camera module.

According to the first aspect or the first to the seventh possible implementations of the first aspect, in an eighth possible implementation of the first aspect, the flexible heat conducting assembly includes a connected region that is disposed through a connection and a suspended region, the connected region is connected to the camera function group, and a part of the flexible heat conducting assembly and that is located in the suspended region is a bent structure, to effectively reduce micro-mobility resistance caused by stretching/shrinking of the flexible heat conducting assembly in a rotation process of the rotatable camera module, and avoid a jam, noise, or the like caused by very large resistance of the rotatable camera module. In addition, such a shape can be used to effectively reduce a reliability problem such as a rupture, delamination, or degumming of the flexible heat conducting assembly and that is caused by stretching/shrinking of the flexible heat conducting assembly in the suspended region and a heat transfer performance deterioration problem.

It can be understood that a shape of the suspended region is at least one of a Z shape, a sawtooth shape, an arc shape, a square-wave shape, and a pulse shape.

According to the first aspect or the first to the eighth possible implementations of the first aspect, in a ninth possible implementation of the first aspect, a stress groove is disposed on the flexible heat conducting assembly in the suspended region, and is used to cushion a stress generated when the flexible heat conducting assembly is pulled due to rotation of the camera function group, to effectively reduce a shear force generated in the flexible heat conducting assembly when the rotatable camera module rotates, avoid heat transfer performance deterioration caused by local tearing and degumming, further weaken a counter torque of the flexible heat conducting assembly for the rotatable camera module, and reduce a risk such as a jam, noise, or a power consumption increase of the rotatable camera module.

According to the first aspect or the first to the ninth possible implementations of the first aspect, in a tenth possible implementation of the first aspect, the camera assembly further includes a thermoelectric cooler fastened between the camera function group and the flexible heat conducting assembly, a cold face of the thermoelectric cooler is disposed towards the camera function group, and a hot face of the thermoelectric cooler is disposed towards the flexible heat conducting assembly, to further improve heat dissipation efficiency of the rotatable camera module.

According to the first aspect or the first to the tenth possible implementations of the first aspect, in an eleventh possible implementation of the first aspect, the end of the camera function group that is connected to the flexible heat conducting assembly is suspended when rotating relative to the auxiliary mount. In this case, the end of the camera function group that is connected to the flexible heat conducting assembly is easily surrounded by air. However, because the flexible heat conducting assembly is connected between the camera function group and the non-rotatable camera module component, the flexible heat conducting assembly can quickly transfer, to the non-rotatable camera module component, the heat generated by a camera function group, to effectively reduce an ambient temperature existing when the end of the camera function group that is connected to the flexible heat conducting assembly is suspended when rotating relative to the auxiliary mount, so as to improve photography performance of the camera assembly.

According to a second aspect of this application, this application further provides an electronic device, including the foregoing camera assembly, the foregoing main mount, and the foregoing main circuit board. The main circuit board is fastened on the main mount, an auxiliary mount is fastened on the main mount and is exposed from one side of the main circuit board and that is away from the main mount, and a rotatable camera module is electrically connected to the main circuit board.

In the second aspect of this application, a flexible heat conducting assembly performs a cross-region transfer on heat generated by the rotatable camera module, to help reduce an ambient temperature of the rotatable camera module, so as to improve photography quality of the rotatable camera module, and shorten a response time of the rotatable camera module.

According to the second aspect, in a first possible implementation of the second aspect, the flexible heat conducting assembly partially extends towards the main mount and is attached to the main mount. In other words, the flexible heat conducting assembly and the main mount form a heat conduction channel, and the flexible heat conducting assembly transfers heat from the rotatable camera module to the main mount, to help improve heat dissipation efficiency of the camera assembly.

According to the second aspect or the first possible implementation of the second aspect, in a second possible implementation of the second aspect, a concave part is disposed on one side of the main mount that faces the auxiliary mount, and the concave part is disposed in alignment with the rotatable camera module. The concave part is configured to facilitate disposing of the flexible heat conducting assembly, and can be used to effectively enlarge the heat dissipation space of the rotatable camera module, to improve the heat dissipation efficiency of the camera assembly.

According to the second aspect or the first and the second possible implementations of the second aspect, in a third possible implementation of the second aspect, the flexible heat conducting assembly partially penetrates through the concave part and is fixedly connected to one side of the main mount that is away from the auxiliary mount, to effectively lengthen the heat conduction channel including the flexible heat conducting assembly and the main mount, so as to improve a heat dissipation effect of a region of the rotatable camera module.

According to the second aspect or the first to the third possible implementations of the second aspect, in a fourth possible implementation of the second aspect, the concave part is a through hole, and the flexible heat conducting assembly penetrates through the concave part and is fixedly connected to the side of the main mount that is away from the auxiliary mount.

According to the second aspect or the first to the fourth possible implementations of the second aspect, in a fifth possible implementation of the second aspect, the camera assembly further includes a connector and a flexible circuit board, the connector is disposed on the main circuit board, one end of the flexible circuit board is electrically connected to the rotatable camera module, at least a part of the flexible heat conducting assembly is attached to one side of the flexible circuit board that is away from the rotatable camera module, and one end of the flexible circuit board that is away from the rotatable camera module is fixedly and electrically connected to the connector.

According to the second aspect or the first to the fifth possible implementations of the second aspect, in a sixth possible implementation of the second aspect, the main circuit board further includes a shielding cover, the shielding cover is disposed on the main circuit board to isolate the connector, the flexible heat conducting assembly is fixedly connected to the shielding cover, and the shielding cover is configured to perform electromagnetic shielding. The flexible heat conducting assembly is fixedly connected to the shielding cover, so that the heat of the rotatable camera module is conducted to the shielding cover, to enlarge a heat dissipation face of the rotatable camera module, and improve heat dissipation flexibility of the camera assembly.

According to the second aspect or the first to the sixth possible implementations of the second aspect, in a seventh possible implementation of the second aspect, there is a gap between the main circuit board and the auxiliary mount, both the shielding cover and the connector are disposed on one side of the main circuit board that is away from the main mount, both the flexible heat conducting assembly and the flexible circuit board penetrate through the gap, the shielding cover is located between the auxiliary mount and the connector, both the flexible heat conducting assembly and the flexible circuit board penetrate through the gap, and the end of the flexible circuit board and that is away from the rotatable camera module protrudes from the flexible heat conducting assembly and is fixedly connected to the connector. The flexible heat conducting assembly conducts the heat to the side of the circuit board that is away from the main mount, to effectively lengthen the heat conduction channel of the rotatable camera module.

According to the second aspect or the first to the seventh possible implementations of the second aspect, in an eighth possible implementation of the second aspect, there is a gap between the main circuit board and the auxiliary mount, the connector is disposed on the side of the main circuit board that is away from the main mount, the shielding cover is disposed on one side of the main circuit board that faces the main mount, the end of the flexible circuit board that is away from the rotatable camera module is separated from the flexible heat conducting assembly and penetrates through the gap, and the connector and the shielding cover are separately disposed on two sides of the circuit board. The flexible circuit board conducts the heat to the side of the circuit board that is away from the main mount, and the flexible heat conducting assembly conducts the heat to the side of the circuit board that faces the main mount, to effectively lengthen the heat conduction channel of the rotatable camera module.

According to the second aspect or the first to the eighth possible implementations of the second aspect, in a ninth possible implementation of the second aspect, the connector is disposed on the side of the main circuit board that is away from the main mount, there is a gap between the main circuit board and the auxiliary mount, the main mount is provided with a concave part penetrating through the main mount, the rotatable camera module is disposed corresponding to the concave part, a first end of the flexible heat conducting assembly is fixedly connected, by using the concave part, to one side of the main mount that is away from the auxiliary mount, the flexible circuit board and the flexible heat conducting assembly penetrate through the gap, a second end of the flexible heat conducting assembly is fixedly connected to the connector, and the main mount, the flexible heat conducting assembly, and the flexible circuit board jointly form a heat conduction channel, to further improve heat dissipation efficiency of a region of the rotatable camera module.

According to the second aspect or the first to the ninth possible implementations of the second aspect, in a tenth possible implementation of the second aspect, the flexible heat conducting assembly extends from a bottom of the rotatable camera module to a location between a fastened module and the main mount, and the flexible heat conducting assembly is connected to both the fastened module and the main mount, so that the heat generated by the rotatable camera module is transferred from the region in which the rotatable camera module is located to the fastened module and the main mount, to lengthen a heat dissipation channel of the rotatable camera module.

These aspects or other aspects of this application are clearer and more comprehensible in descriptions of the following embodiments.

DESCRIPTION OF EMBODIMENTS

First Implementation

Figure 1:
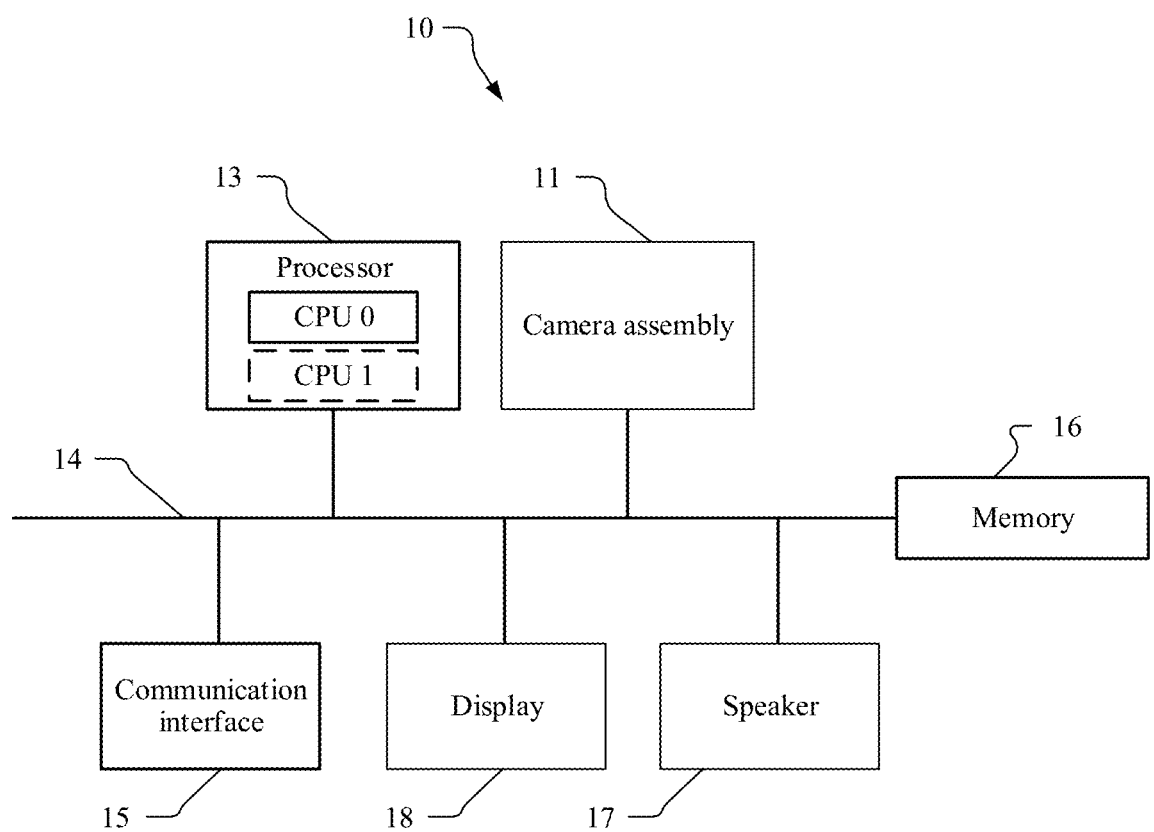
FIG. 1 is a block diagram of a structure of an electronic device according to a first implementation of this application.

FIG. 1 is a block diagram of a structure of an electronic device according to a first implementation of this application. An electronic device 10 includes a camera assembly 11, a processor 13, a communication bus 14, at least one communication interface 15, and a memory 16. The processor 13 is communicatively connected to the camera assembly 11, the at least one communication interface 15, and the memory 16 through the communication bus 14. The electronic device 10 is an electronic device equipped with the camera assembly 11, for example, a smartphone, a smartwatch, a tablet computer, a personal digital assistant (PDA), a notebook computer, a drone, or a monitoring device.

The processor 13 may be a central processing unit (CPU), or may be another general-purpose processor, a digital signal processor (DSP), an application specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor, or the like. The processor 13 is a control center of the electronic device 10, and is connected to various parts of the entire electronic device 10 through various interfaces and lines. The communication bus 14 may include a channel, to transfer information between the foregoing components.

The communication interface 15 may be any apparatus of a transceiver type, and is configured to communicate with another device or a communication network, for example, the Ethernet, a radio access network (RAN), or a wireless local area network (WLAN).

The memory 16 may be configured to store a computer program and/or a module. The processor 13 runs or executes the computer program and/or the module stored in the memory 16 and invokes data stored in the memory 16, to implement various functions of the electronic device 10. The memory 16 may mainly include a program storage area and a data storage area. The program storage area may store an operating system, an application program (for example, a sound playing function or an image playing function) that is required by a plurality of functions, and the like. The data storage area may store data (for example, audio data or a phone book) that is created based on use of the terminal 10, and the like. In addition, the memory 16 may include a high-speed random access memory, and may further include a nonvolatile memory, for example, a hard disk, a memory, an insertion-type hard disk, a smart media card (SMC), a secure digital (SD) card, a flash card, a plurality of magnetic storage devices, a flash memory device, or another volatile solid-state storage device. The memory 16 may exist independently, and is connected to the processor 13 through the communication bus 14. Alternatively, the memory 16 may be integrated with the processor 13.

In a specific implementation, in an embodiment, the electronic device 10 may include a plurality of processors 13 such as a CPU 0 and a CPU 1 in FIG. 1. Each of the plurality of processors 13 may be a single-core processor (single-CPU), or may be a multi-core processor (multi-CPU). The processor herein may be one or more devices, circuits, and/or processing cores configured to process data (for example, computer program instructions).

In this implementation, the electronic device 10 further includes a speaker 17 and a display 18 that are electrically connected to the processor 13. The display 18 is a touch display. A face of the electronic device 10 on which the display 18 is disposed is a front face, and a face of the electronic device 10 that is away from the display 18 is a back face. It can be understood that FIG. 1 is merely an example of the electronic device 10, and does not constitute a limitation on the electronic device 10. The electronic device 10 may include more or fewer components than those shown in FIG. 1, or may combine some components, or have different components. For example, the electronic device 10 may further include an input/output device, a network access device, and the like. This is not limited herein.

Figure 2:
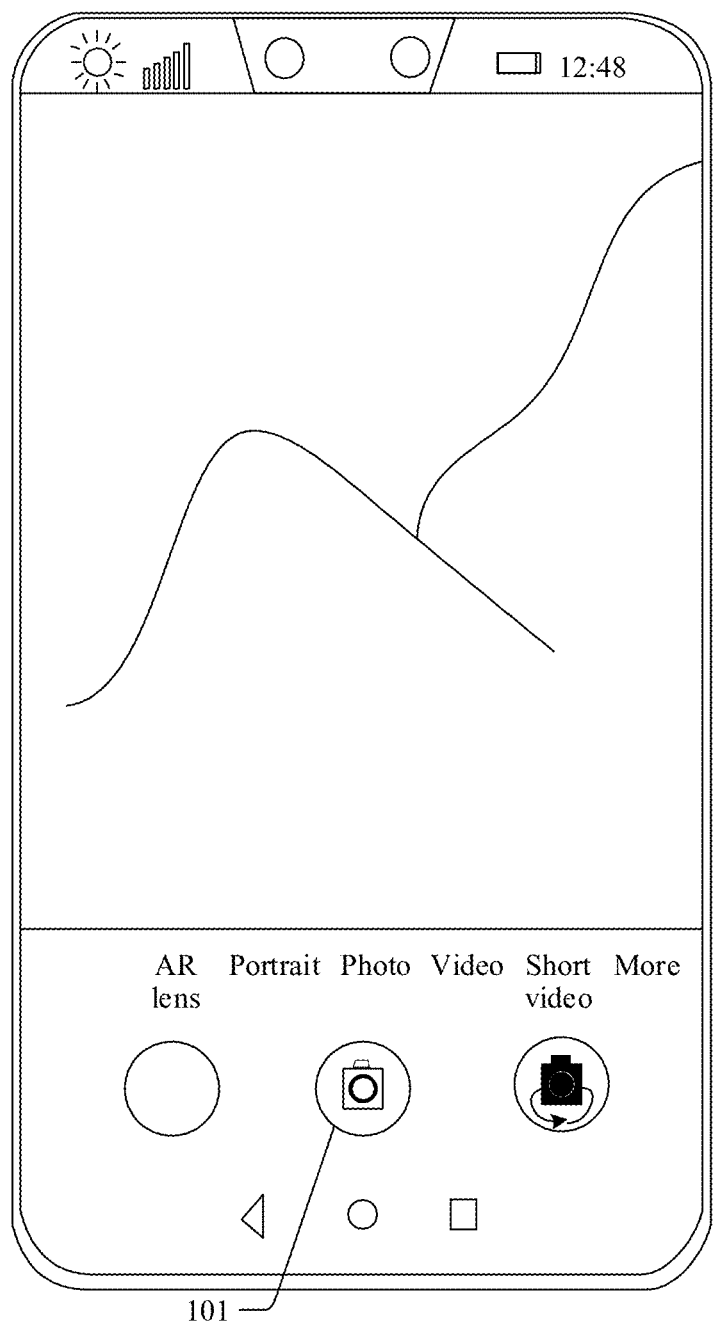
FIG. 2 is a schematic diagram of an application scenario of the electronic device shown in FIG. 1.

FIG. 2 is a schematic diagram of an application scenario of the electronic device shown in FIG. 1. In an application scenario, the electronic device 10 is a consumer electronic device, for example, a smartphone. In this implementation, the camera assembly 11 is a rear-facing camera assembly, and is configured to photograph a scene that the back face of the electronic device 10 faces. When detecting a triggering event of a virtual key 101 corresponding to a photography application, the processor 13 controls to start the camera assembly 11, and a photography interface is correspondingly entered, to help a user to shoot an image. An application scenario of the electronic device 10 shown in FIG. 2 is merely an example. This is not limited in this application.

Figure 3:
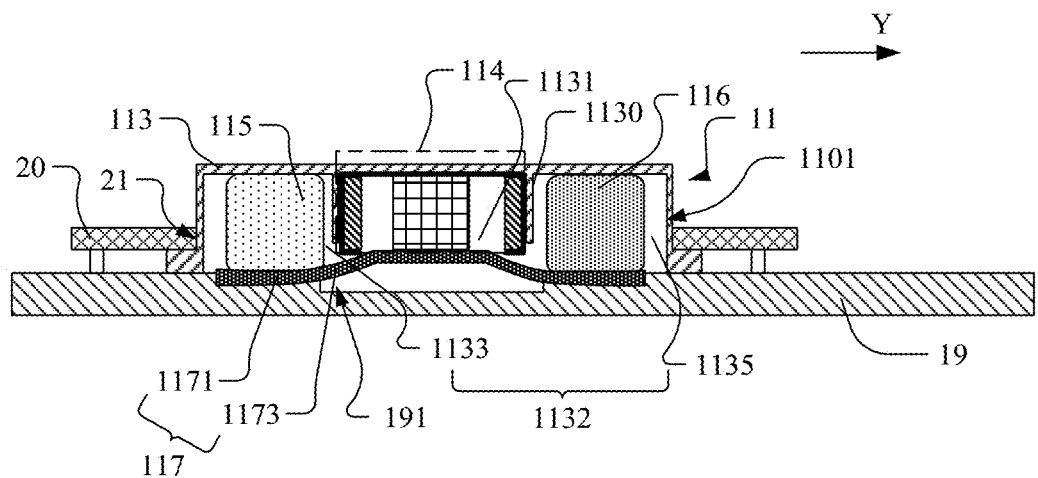
FIG. 3 is a schematic diagram of a partial structure of an electronic device according to a first implementation of this application.

FIG. 3 is a schematic diagram of a partial structure of an electronic device according to a first implementation of this application. The electronic device 10 further includes a main mount 19 and a main circuit board 20. The main circuit board 20 is fastened on the main mount 19. The processor 13 may be disposed on the main circuit board 20 or another structure. This is not limited herein. A through hole 21 is disposed on the main circuit board 20, and the camera assembly 11 penetrates through the through hole 21 and is exposed from one side of the main circuit board 20 that is away from the main mount 19.

The camera assembly 11 includes an auxiliary mount 113, a rotatable camera module 114, a first fastened module 115, a second fastened module 116, and a flexible heat conducting assembly 117. The rotatable camera module 114, the first fastened module 115, and the second fastened module 116 are electrically connected to the processor 13.

The auxiliary mount 113 protrudes from the main mount 19, and is configured to support the rotatable camera module 114, the first fastened module 115, and the second fastened module 116. The auxiliary mount 113 is fixedly connected to the main mount 19, and the auxiliary mount 113 forms accommodation space 1101 for accommodating the rotatable camera module 114, the first fastened module 115, and the second fastened module 116.

The auxiliary mount 113 includes a body 1121 and a partition part 1130 fastened on the body 1121. The body 1121 is fastened on the main mount 19 and penetrates through the through hole 21. The partition part 1130 is accommodated in the accommodation space 1101, and the partition part 1130 partitions the accommodation space 1101 into a first accommodation part 1131 and a second accommodation part 1132. In this implementation, the second accommodation part 1132 includes a first accommodation sub-part 1133 and a second accommodation sub-part 1135. The first accommodation part 1131 is located between the first accommodation sub-part 1133 and the second accommodation sub-part 1135. A concave part 191 is formed on the main mount 19. The concave part 191 is disposed in alignment with the first accommodation part 1131, and the rotatable camera module 114 is accommodated in the concave part 191. The concave part 191 is also disposed in alignment with the rotatable camera module 114 accommodated in the first accommodation part 1131. As shown in FIG. 3, the rotatable camera module 114 is located right above the concave part 191. In a possible implementation, the concave part 191 is disposed in alignment with the rotatable camera module 114 means that both the rotatable camera module 114 and the concave part 191 are arranged on an axis parallel to a stacking direction of the main mount 19 and the auxiliary mount 113. The stacking direction is a direction perpendicular to a first direction Y shown in FIG. 3. The concave part 191 is configured to provide a large activity space for the rotatable camera module 114, to avoid interference to the rotation of the rotatable camera module 114, and help dispose the flexible heat conducting assembly 117 at one end of the rotatable camera module 114 that faces the main mount 19.

In the first direction Y (as shown in FIG. 3), the concave part 191 extends from a corresponding region of the first accommodation part 1131 to a corresponding region of one end of the first accommodation sub-part 1133 that is adjacent to the first accommodation part 1131 and a corresponding region of one end of the second accommodation sub-part 1135 that is adjacent to the first accommodation part 1131.

In other words, in the first direction Y, a length of the concave part 191 is greater than a length of the first accommodation part 1131 and less than a length of the auxiliary mount 113. In this implementation, the main mount 19 is a middle frame of the electronic device 10, and the concave part 191 is a concave groove disposed on one side of the main mount 19 that faces the auxiliary mount 113. It can be understood that the main mount 19 may alternatively be of a support structure, for example, a main board mount.

The rotatable camera module 114 is accommodated in the first accommodation part 1131. There is a gap between the rotatable camera module 114 and a bottom of the concave part 191. In other words, the rotatable camera module 114 is disposed in a suspended state relative to the main mount 19.

The first fastened module 115 is fastened on the first accommodation sub-part 1133, and the second fastened module 116 is fastened on the second accommodation sub-part 1135.

The flexible heat conducting assembly 117 is flexible. In this implementation, an approximate middle region of the flexible heat conducting assembly 117 is fixedly connected to the end of the rotatable camera module 114 that faces the main mount 19, a first end of the flexible heat conducting assembly 117 is connected between the main mount 19 and one end of the first fastened module 115 that faces the main mount 19, and a second end of the flexible heat conducting assembly 117 is connected between the main mount 19 and one end of the second fastened module 116 that faces the main mount 19, so that heat generated by the rotatable camera module 114 is transferred from a region in which the rotatable camera module 114 is located to a region in which the first fastened module 115 and the second fastened module 116 are located, to implement a cross-region heat transfer. In other words, the flexible heat conducting assembly 117 is fixedly connected to a bottom of the rotatable camera module 114, and the flexible heat conducting assembly 117 extends from the bottom of the rotatable camera module 114 to the bottom of the first fastened module 115 and the second fastened module 116. One side of the flexible heat conducting assembly 117 that is away from the first fastened module 115 and the second fastened module 116 is in contact with the main mount 19, so that heat generated by each camera module can be transferred to the main mount 19 by using the flexible heat conducting assembly 117. The flexible heat conducting assembly 117 transfers the heat from the rotatable camera module 114 to another region in which a non-rotatable camera module 114 is located, to help reduce an ambient temperature of the rotatable camera module 114, so as to improve the quality of an image obtained by the rotatable camera module 114. In this implementation, the flexible heat conducting assembly 117 is a graphite sheet. It can be understood that the flexible heat conducting assembly 117 may be single/multi-layer graphite, a graphene film, a copper foil, a composite material of graphite and a copper foil, a thermally conductive plastic, or a phase change material (PCM), a composite material of graphite and a phase change material, liquid metal, a heat pipe, a vapor chamber (VC), or the like.

Figure 4:
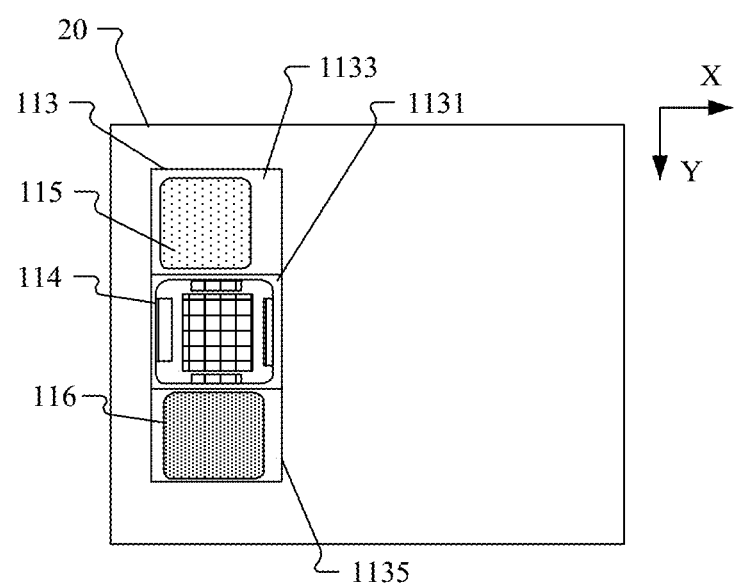
FIG. 4 is a schematic diagram of an arrangement of a camera assembly.

The rotatable camera module 114, the first fastened module 115, and the second fastened module 116 are all electrically connected to the main circuit board 20. In this implementation, FIG. 4 is a schematic diagram of an arrangement of a camera assembly. A width direction of the main circuit board 20 is the first direction Y, a length direction of the main circuit board 20 is a second direction X, and the first direction Y is perpendicular to the second direction X. The first fastened module 115, the rotatable camera module 114, and the second fastened module 116 are disposed in parallel in the first direction Y, and the rotatable camera module 114, the first fastened module 115, and the second fastened module 116 are disposed adjacent to a shorter side edge of the main circuit board 20. It can be understood that the main circuit board 20 is not limited to being disposed outside the auxiliary mount 113. For example, the main circuit board 20 may include two circuit sub-boards (not shown in the figure) disposed at intervals, and the auxiliary mount 113 is disposed between the two circuit sub-boards, or the auxiliary mount 113 is disposed adjacent to the main circuit board 20. It only needs to be ensured that the auxiliary mount 113 is fastened on the main mount 19 and is exposed from the side of the main circuit board that is away from the main mount 19.

Figure 5:
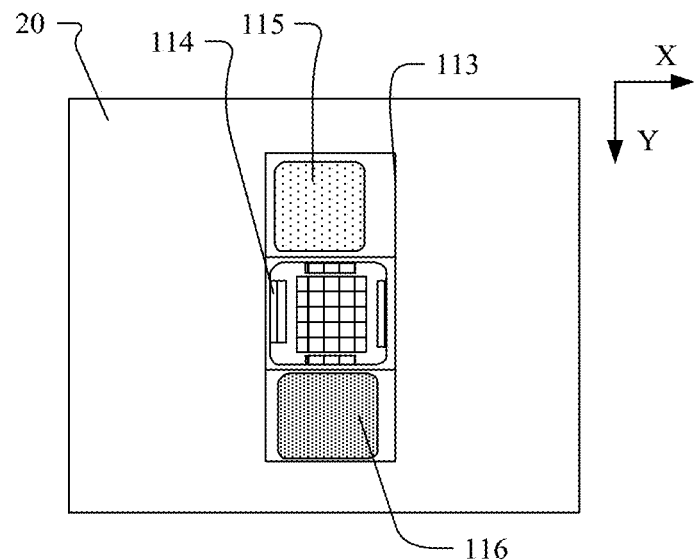
FIG. 5 is a schematic diagram of another arrangement of a camera assembly.
Figure 6:
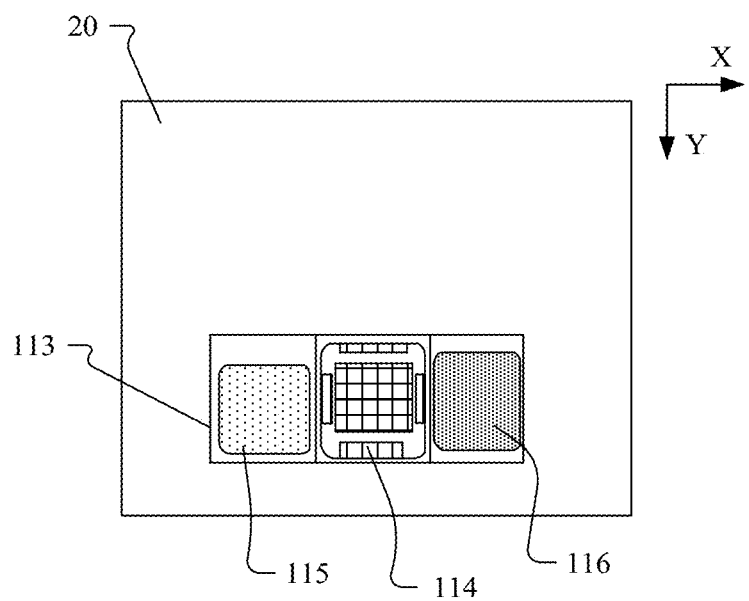
FIG. 6 is a schematic diagram of still another arrangement of a camera assembly.
Figure 7:
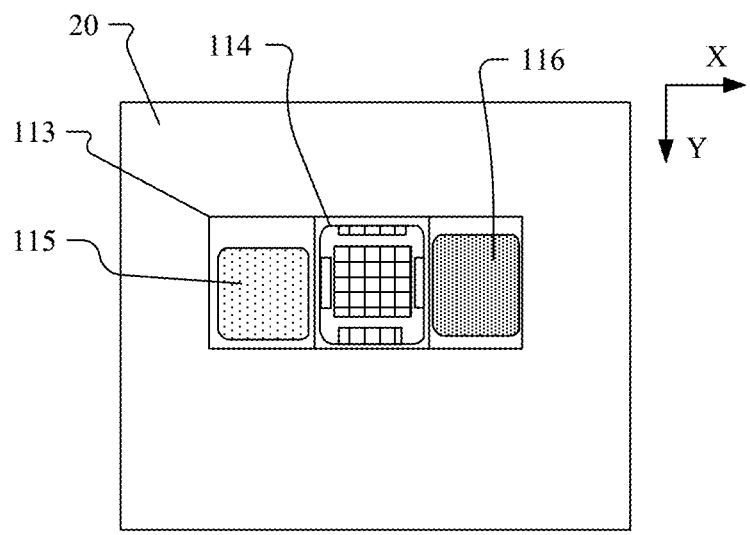
FIG. 7 is a schematic diagram of yet another arrangement of a camera assembly.

It can be understood that, an arrangement and a layout of the rotatable camera module 114, the first fastened module 115, and the second fastened module 116 on the main circuit board are not limited by an example in this application. To avoid another component in the electronic device 10 or implement a specific camera combination, the arrangement of the first fastened module 115, the rotatable camera module 114, and the second fastened module 116 in the camera assembly 11 is adjusted. For example, refer to FIG. 5. The first fastened module 115, the rotatable camera module 114, and the second fastened module 116 are sequentially disposed in parallel in the first direction Y, and the rotatable camera module 114, the first fastened module 115, and the second fastened module 116 are disposed corresponding to the approximate middle region of the main circuit board 20. For another example, refer to FIG. 6. The first fastened module 115, the rotatable camera module 114, and the second fastened module 116 are disposed in parallel in the second direction X, and the rotatable camera module 114, the first fastened module 115, and the second fastened module 116 are disposed adjacent to a longer side edge of the main circuit board 20. For still another example, refer to FIG. 7. The first fastened module 115, the rotatable camera module 114, and the second fastened module 116 are disposed in parallel in the second direction X, and the rotatable camera module 114, the first fastened module 115, and the second fastened module 116 are disposed corresponding to the middle region of the main circuit board 20.

Figure 8:
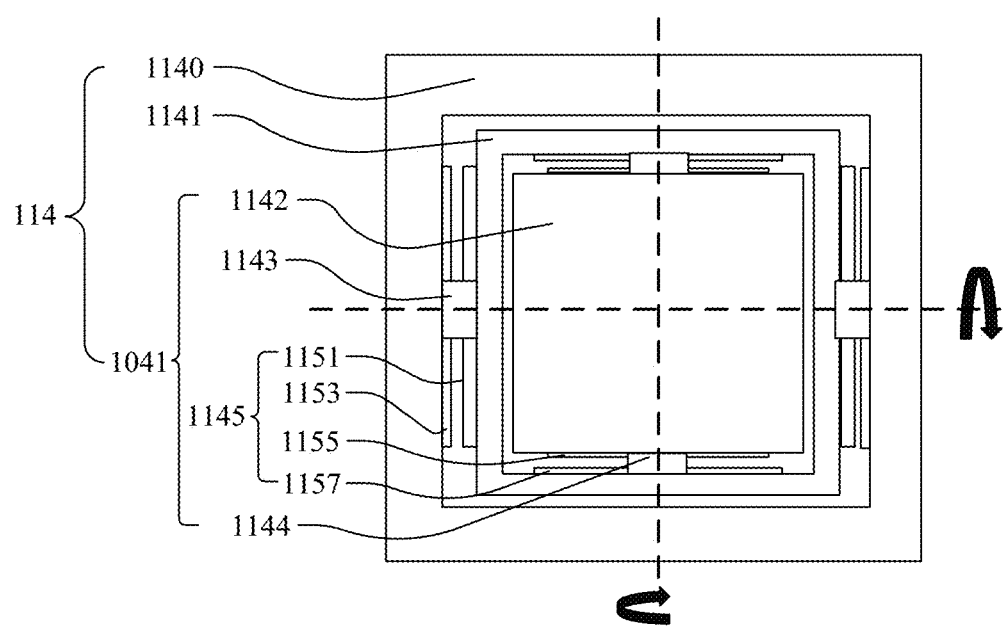
FIG. 8 is a top view of a rotatable camera module according to a first implementation of this application.

More specifically, FIG. 8 is a top view of a rotatable camera module according to a first implementation of this application. The rotatable camera module 114 includes a housing 1140, a rotatable mount 1141, and a camera function group 1041. The housing 1140 is connected to the auxiliary mount 113 by using a bearing and is accommodated in the first accommodation sub-part 1131. The rotatable mount 1141 is rotatably connected to an inner wall of the housing 1140 by using a first rotating shaft 1143, so that the rotatable mount 1141 is rotatably connected to the auxiliary mount 113.

The camera function group 1041 includes a lens module 1142 and a drive component 1145. The lens module 1142 is accommodated in the rotatable mount 1141. The lens module 1142 is rotatably connected to the rotatable mount 1141 by using a second rotating shaft 1144. A light incident surface of the lens module 1142 is disposed in a direction away from the main mount 19. The drive component 1145 is configured to drive the lens module 1142 to rotate around the first rotating shaft 1143 and the second rotating shaft 1144, to perform large angle optical image stabilization. It can be understood that the lens module 1142 may not be rotationally connected to the rotatable mount 1141, and the lens module 1142 is fastened on the rotatable mount 1141.

In this implementation, the drive component 1145 is a magnetic circuit system, to obtain high stabilization accuracy. The drive component 1145 includes a first magnet group 1151, a first coil group 1153, a second magnet group 1155, and a second coil group 1157. The first magnet group 1151 is fastened on the rotatable mount 1141, and the first coil group 1153 is fastened on an inner wall of the housing 1140 that faces the rotatable mount 1141. The first coil group 1153 is disposed outside the first rotating shaft 1143. An interaction force between a magnetic field generated when the first coil group 1153 is energized and a magnetic field of the first magnet group 1151 can be used to drive the rotatable mount 1141 to drive the lens module 1142 to rotate around the first rotating shaft 1143. The second magnet group 1155 is fastened on the lens module 1142, and the second coil group 1157 is fastened on one side of the rotatable mount 1141 that is away from the housing 1140. The second coil group 1157 is disposed outside the second rotating shaft 1144. An interaction force between a magnetic field generated when the second coil group 1157 is energized and a magnetic field of the second magnet group 1155 can be used to drive the lens module 1142 to rotate around the second rotating shaft 1144. An extension direction of the first rotating shaft 1143 is different from an extension direction of the second rotating shaft 1144. In this implementation, the first rotating shaft 1143 and the second rotating shaft 1144 are perpendicular to each other.

Based on Faraday's electromagnetic induction law, a magnitude and a direction of a current existing when the first coil group 1153 and the second coil group 1157 are energized are adjusted, so that the lens module 1142 can rotate synchronously around the first rotating shaft 1143 and the second rotating shaft 1144 at a plurality of angles.

Figure 9:
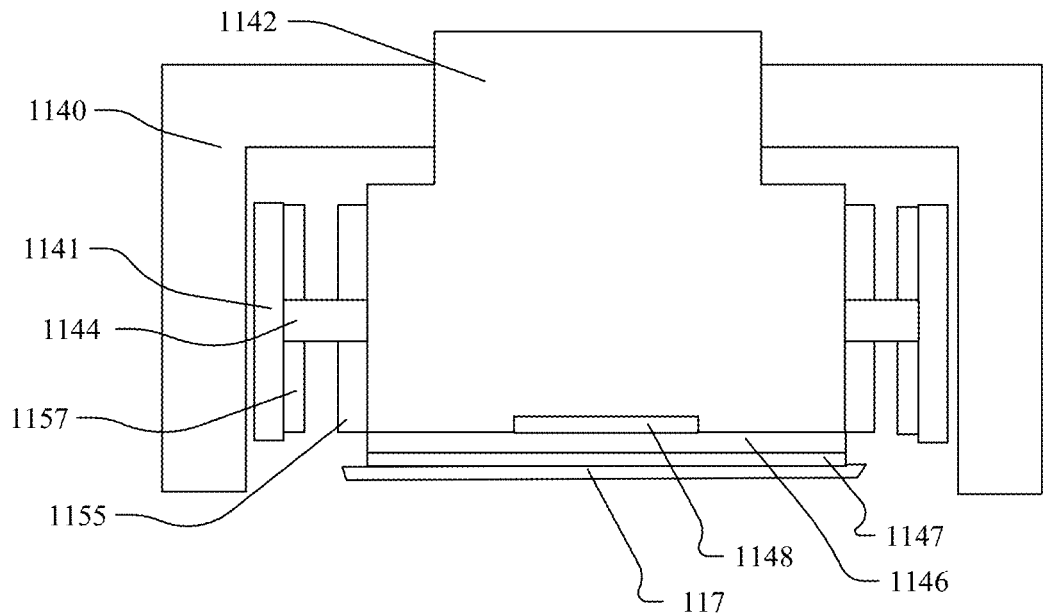
FIG. 9 is a cutaway drawing of a rotatable camera module according to a first implementation of this application.

FIG. 9 is a cutaway drawing of a rotatable camera module according to a first implementation of this application. The camera function group 1041 further includes a drive circuit board 1146, a reinforcement component 1147, and an image sensor 1148. The drive circuit board 1146 is fastened on one end of the lens module 1142 that faces the main mount 19. In this implementation, the drive circuit board 1146 is a hard circuit board. The reinforcement component 1147 is attached to one side of the drive circuit board 1146 that is away from the lens module 1142, and the reinforcement component 1147 is configured to strengthen strength of the drive circuit board 1146. The image sensor 1148 is fastened on one side of the drive circuit board 1146 that faces the lens module 1142, and is configured to: receive light information entering from the light incident surface of the lens module 1142, and convert the light information into image information. The image sensor 1148 is electrically connected to the drive circuit board 1146. The image sensor 1148 is located between the drive circuit board 1146 and the lens module 1142. In other words, the lens module 1142, the image sensor 1148, the drive circuit board 1146, and the reinforcement component 1147 are sequentially disposed in a stacked manner. One end of the rotatable camera module 114 and at which the image sensor 1148 is disposed is the bottom of the rotatable camera module 114. In other words, one end of the rotatable camera module 114 that is away from the light incident surface of the rotatable camera module 114 is the bottom of the rotatable camera module 114.

It can be understood that, the housing 1440 may be omitted from the rotatable camera module 114, and the rotatable camera module 114 is directly disposed on the auxiliary mount 113, and the first coil group 1153 may be fastened on an inner wall of the auxiliary mount 113.

The flexible heat conducting assembly 117 is fixedly connected to one side of the reinforcement component 1147 that is away from the lens module 1142. In other words, the flexible heat conducting assembly 117 is fixedly connected to the bottom of the rotatable camera module 114. The first end of the flexible heat conducting assembly 117 is located between the first fastened module 115 and the main mount 19, and the second end of the flexible heat conducting assembly 117 is located between the second fastened module 116 and the main mount 19. Even if one end (the end at which the drive circuit board 1146 is located) of the camera function group 1041 that faces the main mount 19 is suspended when the camera function group 1041 rotates relative to the auxiliary mount 113, heat generated by the image sensor 1148 can be transferred to the first fastened module 115, the second fastened module 116, and the main mount 19 through the drive circuit board 1146, the reinforcement component 1147, and the flexible heat conducting assembly 117. In other words, the drive circuit board 1146, the reinforcement component 1147, the flexible heat conducting assembly 117, the first fastened module 115, the second fastened module 116, and the main mount 19 form a plurality of heat conduction paths, to implement cross-region heat dissipation. Because heat generated by the camera function group 1041 can be quickly transferred to the first fastened module 115, the second fastened module 116, and the main mount 19 through the flexible heat conducting assembly 117, an ambient temperature of the image sensor 1148 and the lens module 1142 is effectively reduced, to improve quality of the image shot by the rotatable camera module 114 and prolong a shooting time period of the rotatable camera module 114.

It can be understood that the first end of the flexible heat conducting assembly 117 may be attached between the first fastened module 115 and the main mount 19 by using an adhesive, or may be directly disposed between the first fastened module 115 and the main mount 19. The second end of the flexible heat conducting assembly 117 may be attached between the second fastened module 116 and the main mount 19 by using an adhesive, or may be directly disposed between the second fastened module 116 and the main mount 19. It can be understood that the drive component 1145 is not limited to a magnetic circuit system, but may alternatively be another drive structure.

It can be understood that an extension direction of the flexible heat conducting assembly 117 is not limited. It only needs to be ensured that the flexible heat conducting assembly 117 is partially fastened on the reinforcement component 1147, and the flexible heat conducting assembly 117 and the reinforcement component 1147 are fixedly connected and partially extend towards an outside of the rotatable camera module 114 to another region in which the non-rotatable camera module 114 is located.

It can be understood that the reinforcement component 1147 may be omitted from the camera function group 1041, and the flexible heat conducting assembly 117 is fixedly connected to the drive circuit board 1146 directly.

In this implementation, refer to FIG. 3 again. The flexible heat conducting assembly 117 includes three connected regions 1171 that are disposed through a connection and two suspended regions 1173. A first connected region 1171 is located at the first end of the flexible heat conducting assembly 117, and a part of the flexible heat conducting assembly 117 that is in the first connected region 1171 is located between the first fastened module 115 and the main mount 19, and is in contact with the first fastened module 115 and the main mount 19. A second connected region 1171 is disposed at the second end of the flexible heat conducting assembly 117, and a part of the flexible heat conducting assembly 117 that is in the second connected region 1171 is located between the second fastened module 116 and the main mount 19, and is in contact with the second fastened module 116 and the main mount 19. The third connected region 1171 is approximately located in the middle region of the flexible heat conducting assembly 117, and a part of the flexible heat conducting assembly 117 that is in the third connected region 1171 is fixedly connected to the bottom of the rotatable camera module 114. A part of the flexible heat conducting assembly 117 that is in a suspended region 1173 is apart of the flexible heat conducting assembly 117 that is not in contact with another structural element, and each suspended region 1173 is located between two connected regions 1171.

Figure 10:
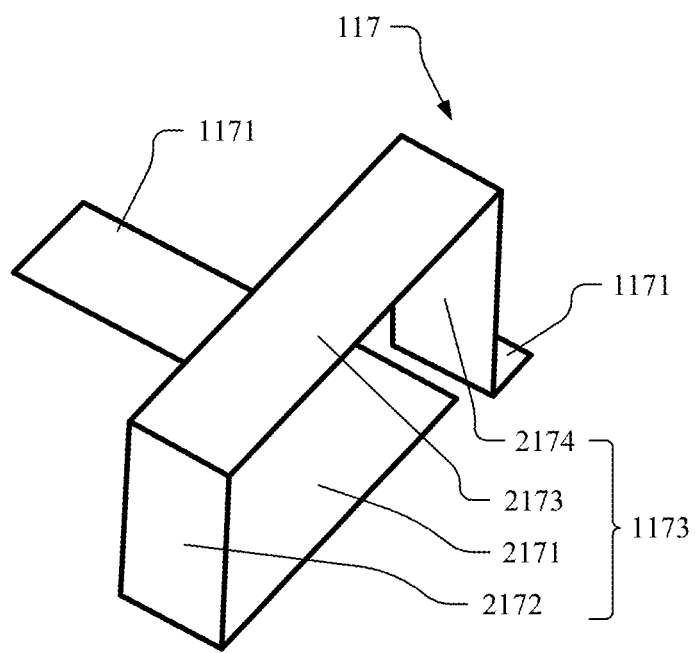
FIG. 10 is a three-dimensional schematic diagram of a part of a flexible heat conducting assembly.

A part of the flexible heat conducting assembly 117 and that is located in the suspended region 1173 is a bent structure, to reduce stress generated when the flexible heat conducting assembly 117 is pulled due to rotation of the rotatable camera module 114. In an implementation, refer to FIG. 10. The bent structure of the flexible heat conducting assembly 117 that is in the suspended region 1173 includes a first connected section 2171, a second connected section 2172, a third connected section 2173, and a fourth connected section 2174. One end of the first connected section 2171 is connected to the third connected region 1171 for fastening the rotatable camera module 114 (a connected region 1171 on a left side in FIG. 10), the second connected section 2172 is formed by bending and extending the another end of the first connected section 2171, the third connected section 2173 is formed by bending and extending one end of the second connected section 2172 that is away from the first connected section 2171, the fourth connected section 2174 is formed by bending and extending one end of the third connected section 2173 that is away from the second connected section 2172, and one end of the fourth connected section 2174 that is away from the third connected section 2173 is connected to the first connected region 1171 for fastening the main mount 19. The first connected section 2171 is approximately parallel to the third connected section 2173, and the second connected section 2172 is approximately parallel to the fourth connected section 2174.

Figure 11:
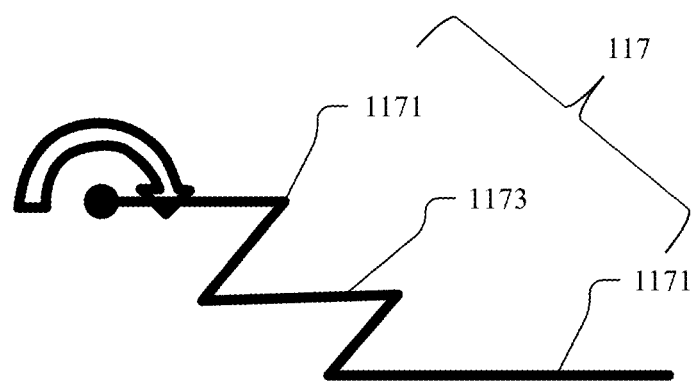
FIG. 11 is a schematic diagram in which a flexible heat conducting assembly in a suspended region is in a Z shape.
Figure 12:
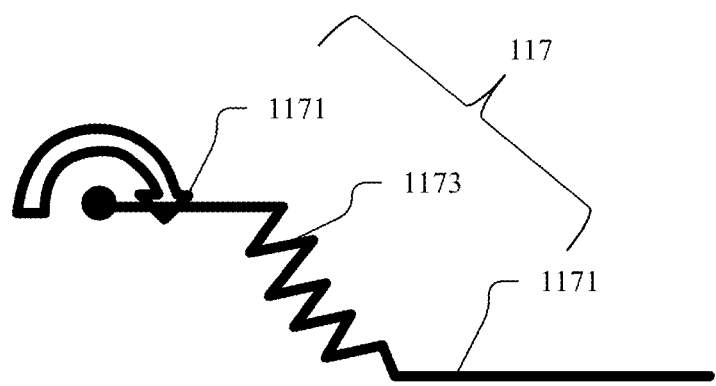
FIG. 12 is a schematic diagram in which a flexible heat conducting assembly in a suspended region is in a sawtooth shape.
Figure 13:
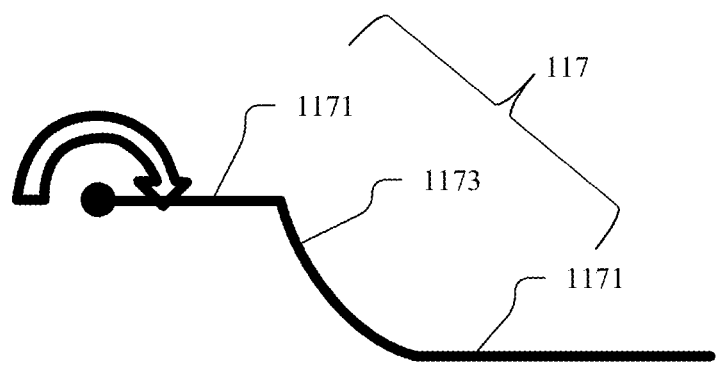
FIG. 13 is a schematic diagram in which a flexible heat conducting assembly in a suspended region is in an arc shape.
Figure 14:
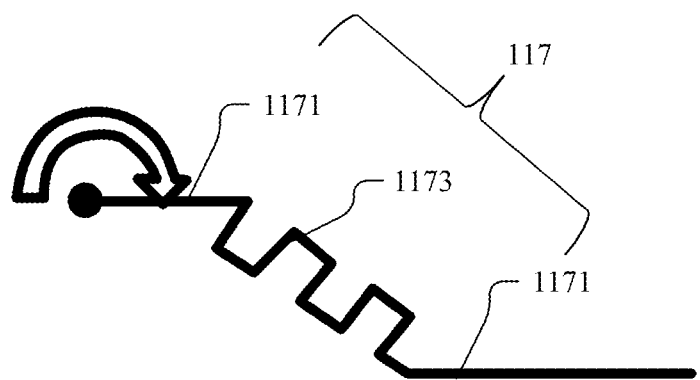
FIG. 14 is a schematic diagram in which a flexible heat conducting assembly in a suspended region is in a square-wave shape.
Figure 15:
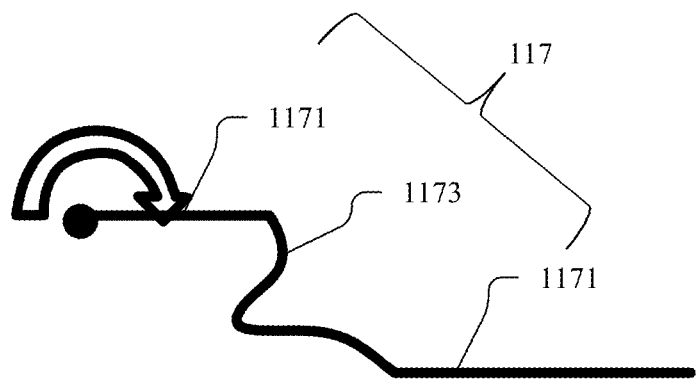
FIG. 15 is a schematic diagram in which a flexible heat conducting assembly in a suspended region is in a pulse shape.

It can be understood that a structure and a shape of the flexible heat conducting assembly 117 located in the suspended region 1173 are not limited. Structures shown in FIG. 11 to FIG. 15 are some structures of the flexible heat conducting assembly 117. The suspended region 1173 is located between two connected regions 1171. One connected region 1171 is connected to the reinforcement component 1147 at the bottom of the rotatable camera module 114, and one connected region 1171 is connected to the main mount 19 or another region. The shape of the flexible heat conducting assembly 117 in the suspended region 1173 may be a Z shape (as shown in FIG. 11), a sawtooth shape (as shown in FIG. 12), an arc shape (as shown in FIG. 13), a square-wave shape (as shown in FIG. 14), a pulse shape (as shown in FIG. 15), or the like. In an implementation, the shape of the flexible heat conducting assembly 117 in the suspended region 1173 includes at least one of a Z shape, a sawtooth shape, an arc shape, a square-wave shape, and a pulse shape. Because the suspended region 1173 is of a bent structure, micro-mobility resistance caused by stretching/shrinking of the flexible heat conducting assembly 117 in a rotation process of the rotatable camera module 114 can be effectively reduced, and a jam, noise, or the like caused by very large resistance of the rotatable camera module 114 can be avoided. In addition, the bent structure of the suspended region 1173 can be used to effectively reduce a reliability problem such as a rupture, delamination, or degumming of the flexible heat conducting assembly 117 that is caused by stretching/shrinking of the flexible heat conducting assembly 117 in the suspended region 1173 and a heat transfer performance deterioration problem.

Figure 16:
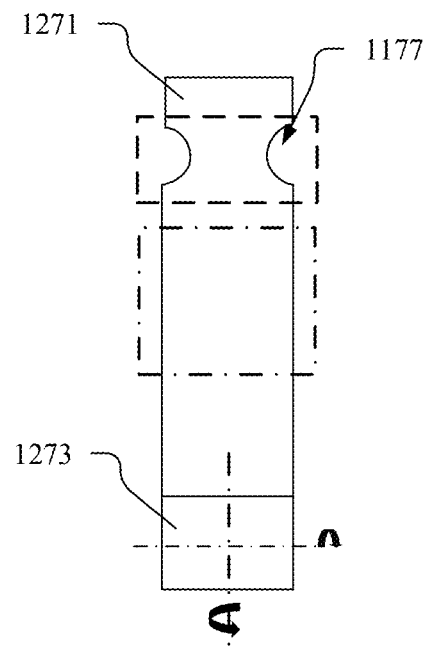
FIG. 16 is a schematic diagram in which an arc-shaped first stress groove is disposed on a part of a flexible heat conducting assembly that is at a near fixed end of a suspended region.

In an implementation, refer to FIG. 16. The suspended region 1173 includes a near fixed end 1271 and a near heat source end 1273. Compared with the near fixed end 1271, the near heat source end 1273 is one end that is more adjacent to the rotatable camera module 114 in the suspended region 1173. A first stress groove 1177 is disposed at an edge of the flexible heat conducting assembly 117 that is at the near fixed end 1271, and is used to cushion a stress generated when the flexible heat conducting assembly 117 is bent. The first stress groove 1177 may be obtained by hollowing out the flexible heat conducting assembly 117, a cross section is in an arc shape, and the cross section of the first stress groove 1177 has a radian range of 0 degrees to 360 degrees, for example, 90 degrees or 180 degrees. The first stress groove 1177 is disposed, to weaken a stress concentration, so as to effectively reduce a shear force generated in the flexible heat conducting assembly 117 when the rotatable camera module 114 rotates, avoid heat transfer performance deterioration caused by local tearing and degumming, further weaken a counter torque of the flexible heat conducting assembly 117 for the rotatable camera module 114, and reduce the risk of a jam, noise, or a power consumption increase of the rotatable camera module 114.

Figure 17:
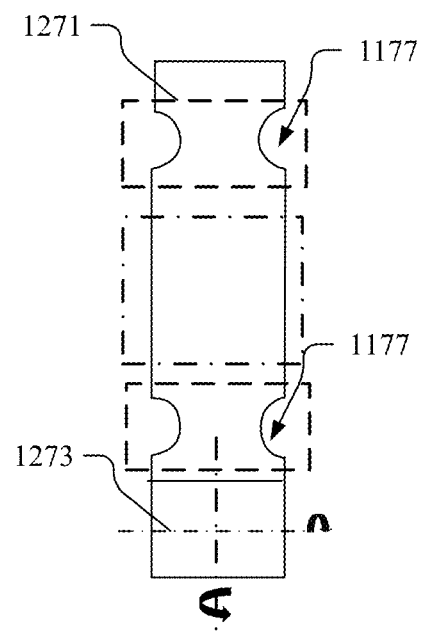
FIG. 17 is a schematic diagram in which an arc-shaped first stress groove is disposed on a part of a flexible heat conducting assembly that is at each of a near fixed end and a near heat source end of a suspended region.

In an implementation, refer to FIG. 17. A first stress groove 1177 is disposed at each of the edges of the flexible heat conducting assembly 117 that are at a near fixed end 1271 and a near heat source end 1273, a cross section of the first stress groove 1177 is in an arc shape, and a radian of the first stress groove 1177 is approximately 180 degrees.

Figure 18:
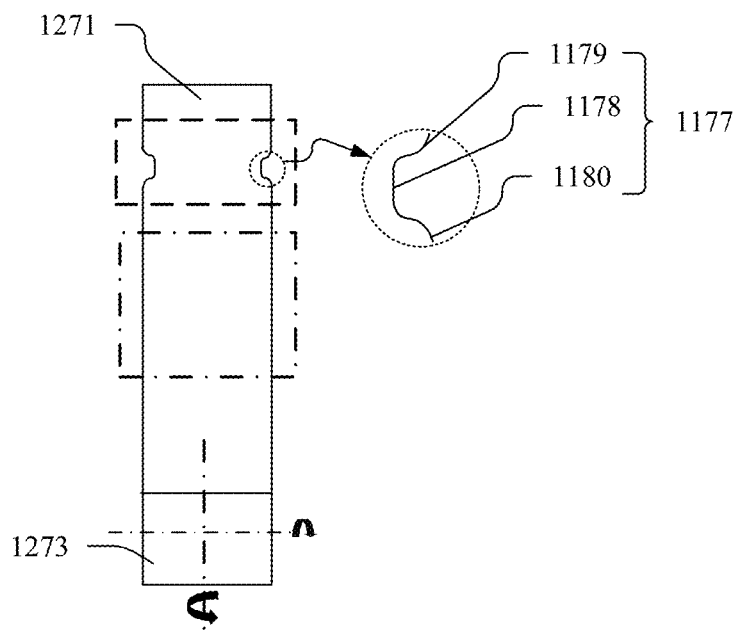
FIG. 18 is a schematic diagram in which a first stress groove of a double-arc-shaped structure is disposed on a part of a flexible heat conducting assembly that is at a near fixed end of a suspended region.

In an implementation, refer to FIG. 18. A first stress groove 1177 is disposed at an edge at a near fixed end 1271, and the first stress groove 1177 includes a connected section 1178, a first arc section 1179, and a second arc section 1180. The connected section 1178 is connected between the first arc section 1179 and the second arc section 1180. In other words, the first stress groove 1177 has a double-arc-shaped structure. "Double circle" hollowing-out processing is performed on the edge at the near fixed end 1271, to improve stress cushioning performance of the first stress groove 1177.

Figure 19:
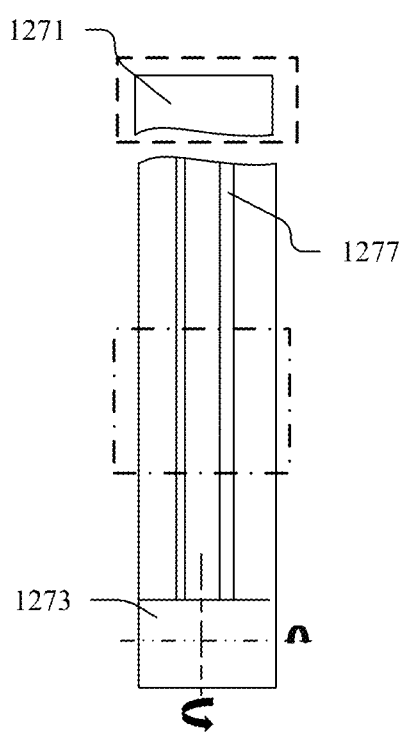
FIG. 19 is a schematic diagram in which a second stress groove is disposed on a part of a flexible heat conducting assembly that is in a suspended region.

In an implementation, refer to FIG. 19. A plurality of second stress grooves 1277 are disposed at intervals on the flexible heat conducting assembly 117 in the suspended region 1173 in a width direction of the flexible heat conducting assembly 117, to cushion a stress generated when the flexible heat conducting assembly 117 is bent. The second stress groove 1277 extends from the near fixed end 1271 towards the near heat source end 1273. A first stress groove may be further disposed at the near fixed end 1271 and/or the near heat source end 1273. It can be understood that an extension direction of the second stress groove 1277 is not limited.

It can be understood that shapes and an arrangement of stress grooves disposed on the flexible heat conducting assembly 117 in the suspended region 1173 are not limited.

Figure 20:
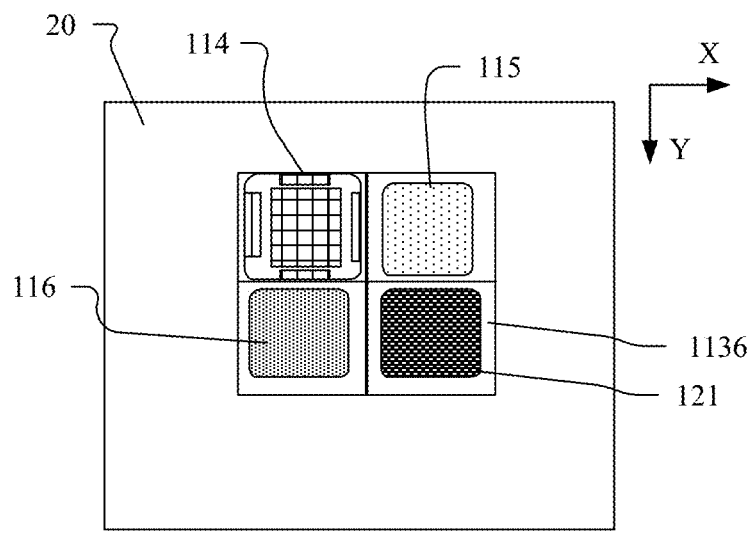
FIG. 20 is a schematic diagram of an arrangement in which a camera assembly includes a rotatable camera module and three fastened modules.
Figure 21:
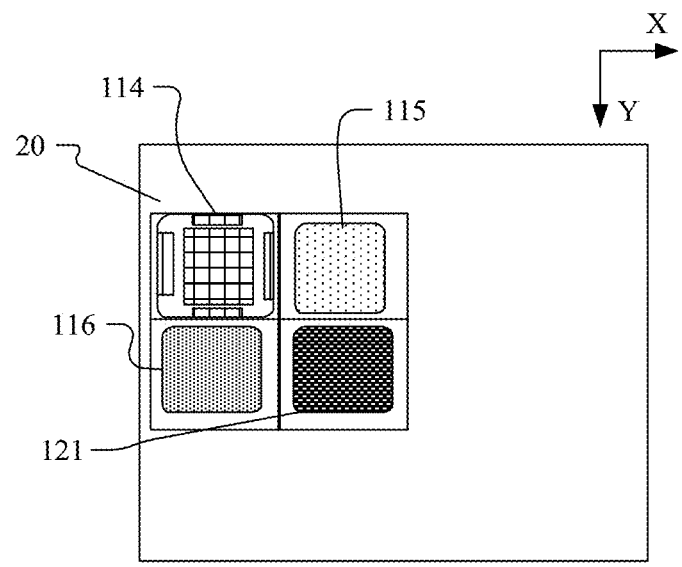
FIG. 21 is a schematic diagram of another arrangement in which a camera assembly includes a rotatable camera module and three fastened modules.

It can be understood that the camera assembly 11 may include at least two fastened modules. In an implementation, refer to FIG. 20. The auxiliary mount 113 further includes a third accommodation sub-part 1136, the camera assembly 11 further includes a third fastened module 121 fixedly accommodated in the third accommodation sub-part 1136, the rotatable camera module 114, the first fastened module 115, the second fastened module 116, and the third fastened module 121 are arranged in an array, the rotatable camera module 114 and the first fastened module 115 are arranged in the second direction X and are located in a same row, the second fastened module 116 and the third fastened module 121 are arranged in the second direction X and are located in a same row, the rotatable camera module 114 and the second fastened module 116 are arranged in the first direction Y and are located in a same row, and the first fastened module 115 and the third fastened module 121 are arranged in the first direction Y and are located in a same row. The rotatable camera module 114, the first fastened module 115, the second fastened module 116, and the third fastened module 121 are disposed corresponding to the middle region of the main circuit board 20. In an implementation, refer to FIG. 21. The rotatable camera module 114, the first fastened module 115, the second fastened module 116, and the third fastened module 121 are disposed adjacent to the shorter side edge of the main circuit board 20. The third fastened module 121 is a fastened camera module or an auxiliary camera module such as a flash.

Figure 22:
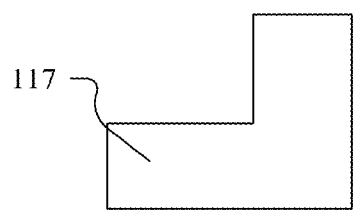
FIG. 22 is a schematic diagram in which a flexible heat conducting assembly is in an L shape.
Figure 23:
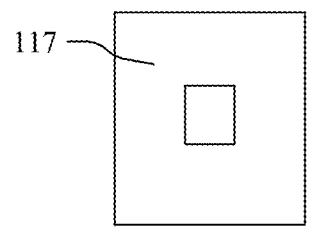
FIG. 23 is a schematic diagram in which a flexible heat conducting assembly is in a square shape.
Figure 24:
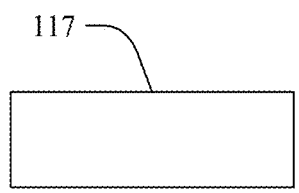
FIG. 24 is a schematic diagram in which a flexible heat conducting assembly is in a strip shape.

It can be understood that the shape of the flexible heat conducting assembly 117 may be disposed based on an arrangement of the rotatable camera module 114 and another fastened module (for example, the first fastened module 115, and/or the second fastened module 116, and/or the third fastened module 121). The flexible heat conducting assembly 117 is approximately in an L shape (as shown in FIG. 22), a square shape (as shown in FIG. 23), or a strip shape (as shown in FIG. 24).

Figure 25:
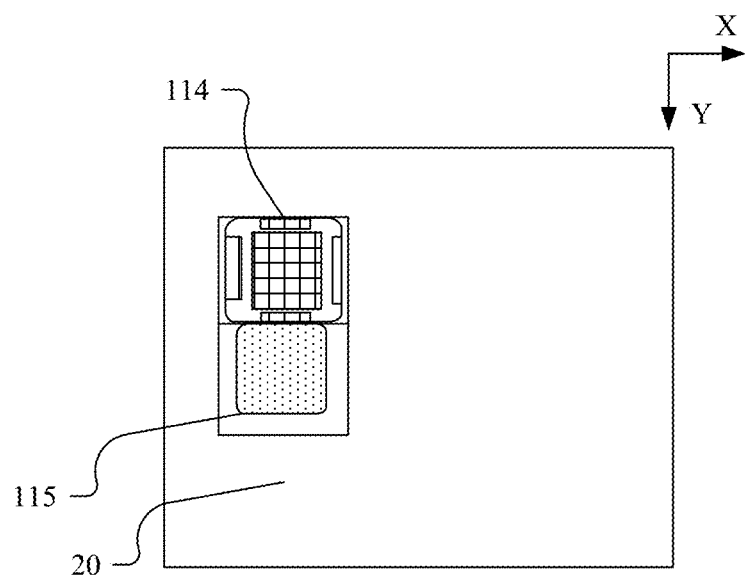
FIG. 25 is a schematic diagram of an arrangement in which a camera assembly includes a rotatable camera module and one fastened module.
Figure 26:
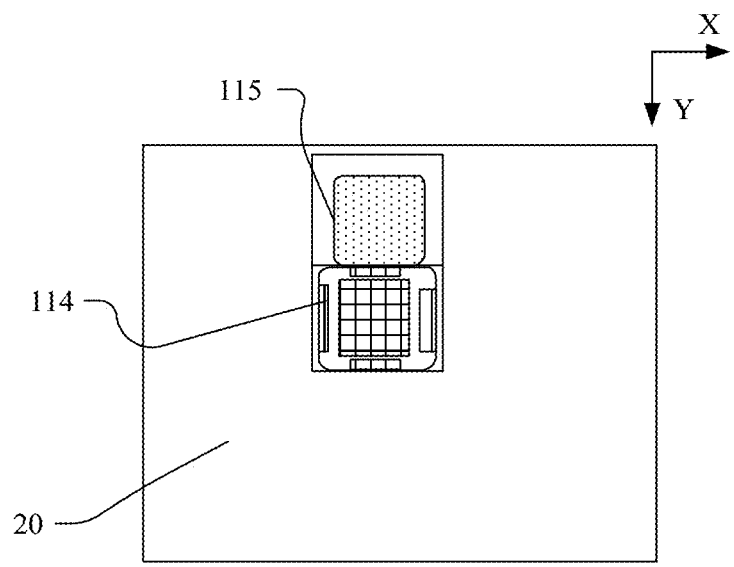
FIG. 26 is a schematic diagram of another arrangement in which a camera assembly includes a rotatable camera module and one fastened module.

It can be understood that the second fastened module 116 may be omitted from the camera assembly 11. In an implementation, refer to FIG. 25. The rotatable camera module 114 and the first fastened module 115 are arranged in the first direction Y and are disposed adjacent to the shorter side edge of the main circuit board 20. In an implementation, refer to FIG. 26. The first fastened module 115 and the rotatable camera module 114 are arranged in the first direction Y and are disposed adjacent to the longer side edge of the main circuit board 20.

Figure 27:
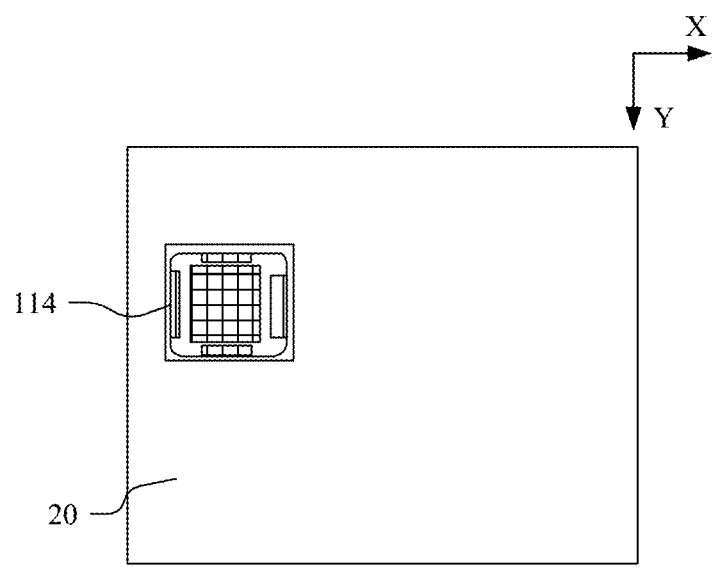
FIG. 27 is a schematic diagram of an arrangement in which a camera assembly includes one rotatable camera module.
Figure 28:
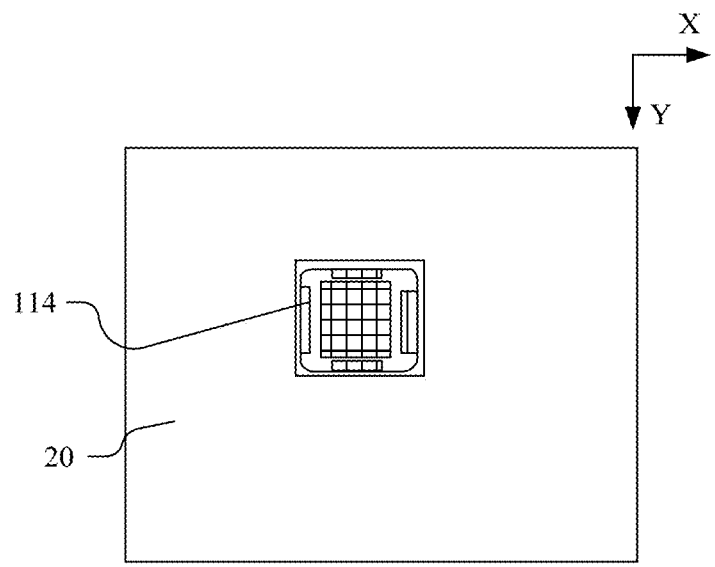
FIG. 28 is a schematic diagram of another arrangement in which a camera assembly includes one rotatable camera module.

It can be understood that the first fastened module 115 and the second fastened module 116 may be omitted from the camera assembly 11. In an implementation, refer to FIG. 27. The rotatable camera module 114 is approximately disposed adjacent to a shorter side edge of the main circuit board 20. In an implementation, refer to FIG. 28. The rotatable camera module 114 is approximately disposed corresponding to the middle region of the main circuit board 20.

Figure 29:
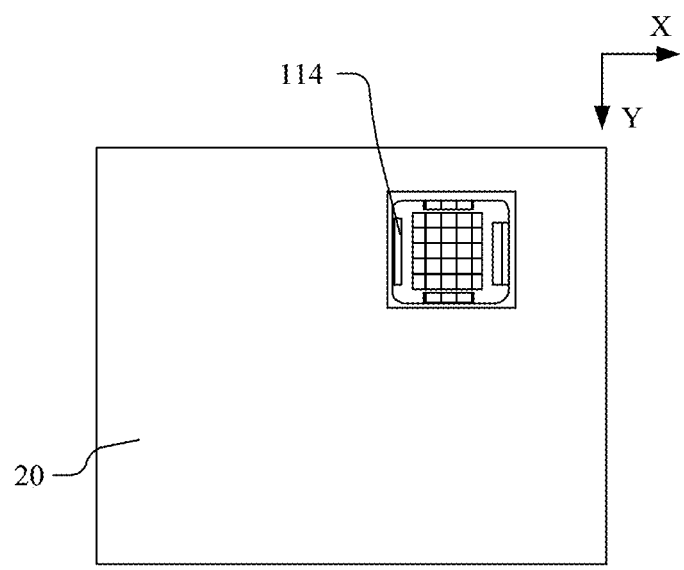
FIG. 29 is a schematic diagram of still another arrangement in which a camera assembly includes one rotatable camera module.
Figure 30:
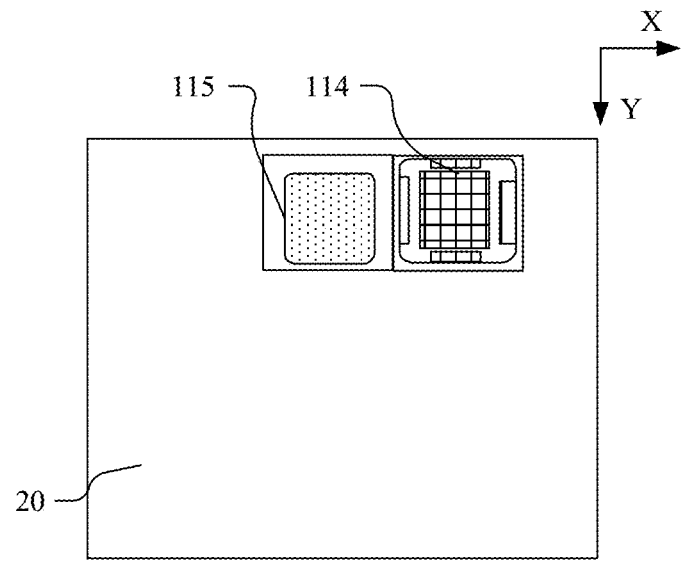
FIG. 30 is a schematic diagram of an arrangement in which a camera assembly includes a rotatable camera module and one fastened module.
Figure 31:
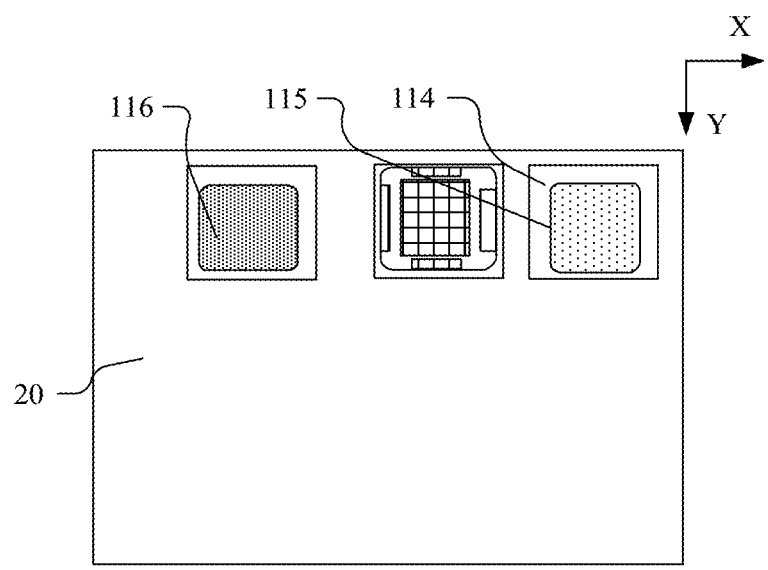
FIG. 31 is a schematic diagram of an arrangement in which a camera assembly includes a rotatable camera module and two fastened modules.

It can be understood that the camera assembly 11 may be a front-facing camera assembly. In an implementation, refer to FIG. 29. The first fastened module 115 and the second fastened module 116 are omitted from the camera assembly 11, and the light incident surface of the rotatable camera module 114 faces a same direction as a light incident surface of the display 18. In other words, the rotatable camera module 114 is configured to image an object that a front face of the electronic device 10 faces, and the rotatable camera module 114 is disposed adjacent to atop edge of the electronic device 100, to avoid another component of the electronic device 10. For another example, in an implementation, refer to FIG. 30. The second fastened module 116 is omitted from the camera assembly 11, and the first fastened module 115 and the rotatable camera module 114 are sequentially arranged in the second direction X, and are disposed adjacent to a top edge of the electronic device 100. For still another example, in an implementation, refer to FIG. 31. The rotatable camera module 114, the first fastened module 115, and the second fastened module 116 are sequentially arranged at intervals in the second direction X, and the rotatable camera module 114, the first fastened module 115, and the second fastened module 116 may be supported by different auxiliary mounts 113.

Second Implementation

Figure 32:
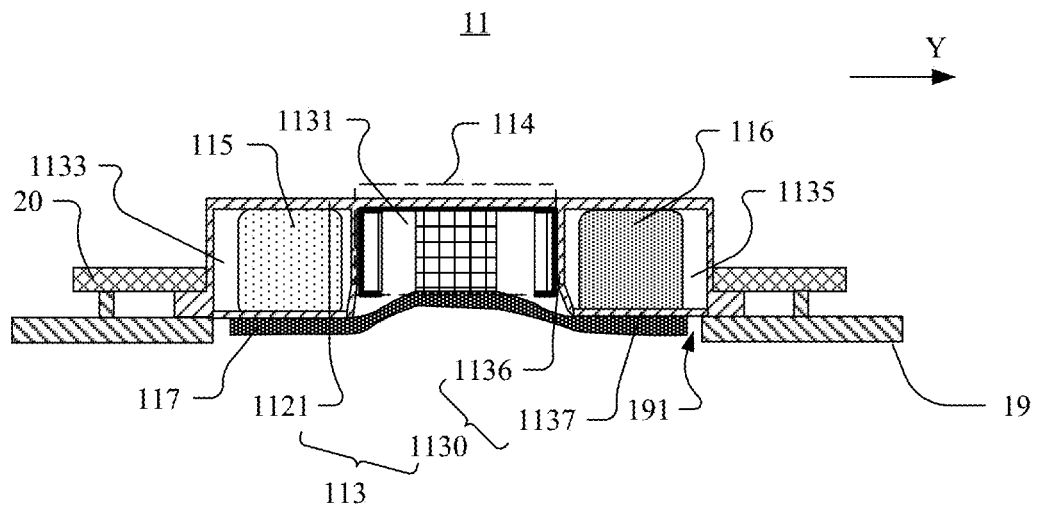
FIG. 32 is a schematic diagram of a partial structure of an electronic device according to a second implementation of this application.

A structure of an electronic device provided in the second implementation is approximately the same as a structure of the electronic device provided in the first implementation. FIG. 32 is a schematic diagram of a partial structure of an electronic device according to a second implementation of this application. A difference is that a flexible heat conducting assembly 117 and an auxiliary mount 113 form a heat conduction channel.

Specifically, in a first direction Y, a concave part 191 extends from a corresponding region of a first accommodation part 1131 to a corresponding region of one end of a first accommodation sub-part 1133 that is away from the first accommodation part 1131 and a corresponding region of one end of a second accommodation sub-part 1135 that is away from the first accommodation part 1131. In other words, the concave part 191 is disposed in alignment with the first accommodation part 1131, the first accommodation sub-part 1133, and the second accommodation sub-part 1135, and a length of the concave part 191 is approximately equal to a sum of the lengths of the first accommodation part 1131, the first accommodation sub-part 1133, and the second accommodation sub-part 1135. The partition part 1130 includes a first mounting section 1136 and a second mounting section 1137. One end of the first mounting section 1136 is fixedly connected to a body 1121 and extends towards a main mount 19, the second mounting section 1137 is bent and extended, in a direction away from the first accommodation part 1131, from one end of the first mounting section 1136 that is away from the body 1121, and the second mounting section 1137 is fixedly connected to the body 1121. The first accommodation part 1131 is surrounded by the body 1121 and the first mounting section 1136, and the first accommodation sub-part 1133 and the second accommodation sub-part 1135 are surrounded by the body 1121, the first mounting section 1136, and the second mounting section 1137.

A bottom of a first fastened module 115 is fixedly connected to the second mounting section 1137 of the first accommodation sub-part 1133, and a bottom of the second fastened module 116 is fixedly connected to the second mounting section 1137 of the second accommodation sub-part 1135. A first end of the flexible heat conducting assembly 117 is fixedly connected to the second mounting section 1137 of the first accommodation sub-part 1133, and a second end of the flexible heat conducting assembly 117 is fixedly connected to one side of the second mounting section 1137 of the second accommodation sub-part 1135 that faces the main mount 19. In this implementation, one side of the flexible heat conducting assembly 117 that is away from the main mount 19 is fixedly connected to a reinforcement component (not shown in the figure) of a rotatable camera module 114, the second mounting section 1137 of the first accommodation sub-part 1133, and the second mounting section 1137 of the second accommodation sub-part 1135 by being coated with an adhesive. The flexible heat conducting assembly 117 is not in contact with the main mount 19. The concave part 191 is a through hole, to effectively enlarge heat dissipation space of the rotatable camera module 114. In addition, the flexible heat conducting assembly 117 is fixedly connected to one side of the second mounting section 1137 of the second accommodation sub-part 1135 that faces the main mount 19, so that the flexible heat conducting assembly 117 and the auxiliary mount 113 form a heat conduction channel. In addition, the concave part 191 is a through hole, to help flexibly dispose the flexible heat conducting assembly 117.

Third Implementation

Figure 33:
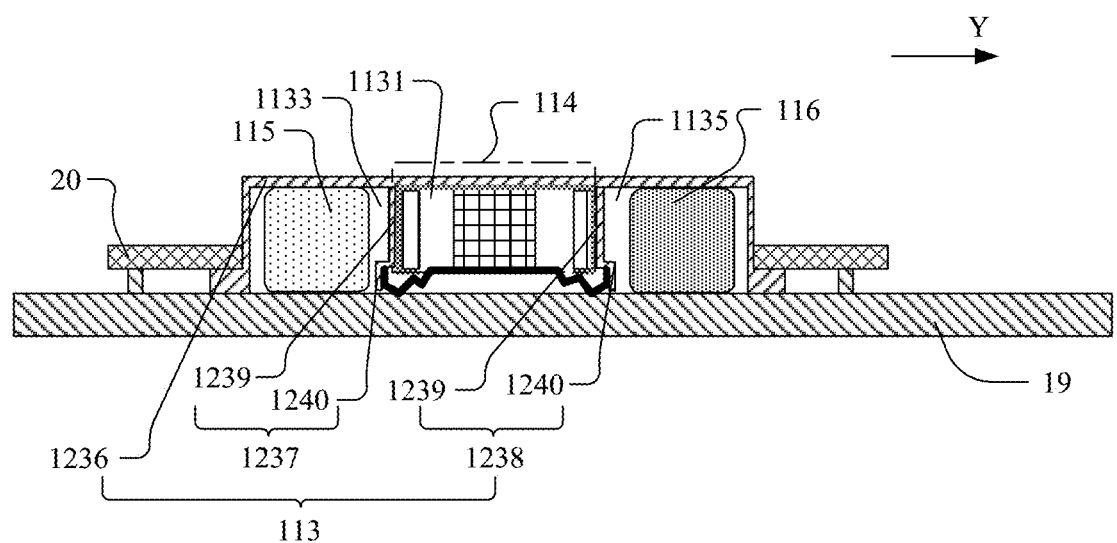
FIG. 33 is a schematic diagram of a partial structure of an electronic device according to a third implementation of this application.

A structure of an electronic device provided in the third implementation is approximately the same as a structure of the electronic device provided in the first implementation. FIG. 33 is a schematic diagram of a partial structure of an electronic device according to a third implementation of this application. A difference is that a flexible heat conducting assembly 117, an auxiliary mount 113, and a main mount 19 form a heat conduction channel.

Specifically, a concave part is omitted from the main mount 19, a bottom of a first fastened module 115 and a bottom of a second fastened module 116 are in contact with the main mount 19, and a first end and a second end of the flexible heat conducting assembly 117 are both connected to the auxiliary mount 113 and are partially connected to the main mount 19. In other words, the flexible heat conducting assembly 117 conducts, to the auxiliary mount 113 and the main mount 19, heat generated by an image sensor (not shown in the figure) of a rotatable camera module 114.

The auxiliary mount 113 includes a body 1236, a first partition part 1237, and a second partition part 1238, and the first partition part 1237 and the second partition part 1238 are fastened on one side of the body 1236 that faces the main mount 19, to partition accommodation space of the auxiliary mount 113 into a first accommodation part 1131, a first accommodation sub-part 1133, and a second accommodation sub-part 1135. The first partition part 1237 is located between the first accommodation part 1131 and the first accommodation sub-part 1133, and the second partition part 1238 is located between the first accommodation part 1131 and the second accommodation sub-part 1135. The first partition part 1237 and the second partition part 1238 each include a first mounting section 1239 and a second mounting section 1240. The first mounting section 1239 is fixedly connected to the body 1236, and the second mounting section 1240 is formed by bending one end of the first mounting section 1239 that is away from the body 1236. A second mounting section 1240 of the first partition part 1237 protrudes and is bent towards one side on which the first fastened module 115 is located. A second mounting section 1240 of the second partition part 1238 protrudes and is bent towards one side on which the second fastened module 116 is located. Therefore, the space of the first accommodation part 1131 is enlarged. A first end of the flexible heat conducting assembly 117 is fixedly connected to an inner wall of the second mounting section 1240 of the first partition part 1237 that faces the first accommodation part 1131 and is in contact with the main mount 19, and a second end of the flexible heat conducting assembly 117 is fixedly connected to an inner wall of the second mounting section 1240 of the second partition part 1238 that faces the first accommodation part 1131 and is in contact with the main mount 19, so that the flexible heat conducting assembly 117 is accommodated in the first accommodation part 1131. Because the flexible heat conducting assembly 117 is accommodated in the first accommodation part 1131, the flexible heat conducting assembly 117 not only can be used to conduct heat of the rotatable camera module 114 to the auxiliary mount 113, but also can be used to reduce interference to another component of the electronic device 10, to facilitate a layout of the another component.

It can be understood that the first fastened module 115 may be not fixedly connected to the auxiliary mount 113, but is supported by the main mount 19, and the second fastened module 116 may be not fixedly connected to the auxiliary mount 113, but is supported by the main mount 19.

Fourth Implementation

Figure 34:
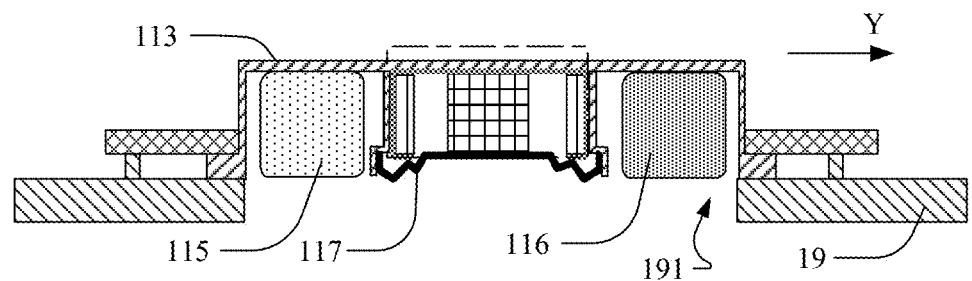
FIG. 34 is a schematic diagram of a partial structure of an electronic device according to a fourth implementation of this application.

A structure of an electronic device provided in the fourth implementation is approximately the same as the structure of the electronic device provided in the third implementation. FIG. 34 is a schematic diagram of a partial structure of an electronic device according to a fourth implementation of this application. A flexible heat conducting assembly 117 and an auxiliary mount 113 form a heat conduction channel. A difference is that a main mount 19 includes a concave part 191, and the concave part 191 is a through hole. A first fastened module 115 is fixedly connected to the auxiliary mount 113, the first fastened module 115 is disposed in a suspended state relative to the main mount 19, the second fastened module 116 is fixedly connected to the auxiliary mount 113, and the second fastened module 116 is disposed in a suspended state relative to the main mount 19. Because the concave part 191 is a through hole, the heat dissipation space of the first fastened module 115 and the second fastened module 116 is enlarged, and the flexible heat conducting assembly 117 at a bottom of a rotatable camera module 114 is convenient.

Fifth Implementation

Figure 35:
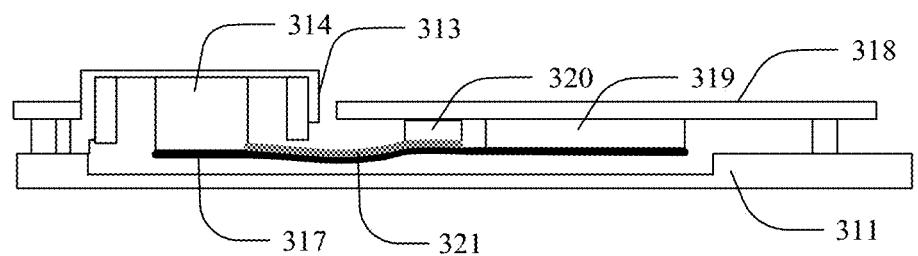
FIG. 35 is a schematic diagram of a partial structure of an electronic device according to a fifth implementation of this application.

A structure of an electronic device provided in the fifth implementation is approximately the same as a structure of the electronic device provided in the first implementation. FIG. 35 is a schematic diagram of a partial structure of an electronic device according to a fifth implementation of this application. A difference is that the electronic device further includes a shielding cover 319, and a camera assembly 31 further includes a connector 320 and a flexible circuit board 321. The shielding cover 319 and the connector 320 are disposed on one side of a main circuit board 318 that faces a main mount 311. The connector 320 is located between the shielding cover 319 and an auxiliary mount 313. The shielding cover 319 is configured to perform electromagnetic shielding. The flexible heat conducting assembly 317 is attached to the flexible circuit board 321. A first end of the flexible heat conducting assembly 317 protrudes from the flexible circuit board 321 and is fastened on a reinforcement component (not shown in the figure) at a bottom of a rotatable camera module 314, and a second end of the flexible heat conducting assembly 317 is fixedly connected to one side of the shielding cover 319 that is away from the main circuit board 318. In this implementation, the connector 320 is a board-to-board connector (BTB). It can be understood that the connector 320 is not limited to a board-to-board connector, or may be of another structure that can be used to fasten the flexible circuit board 321 on the main circuit board 318, to implement signal transmission.

A first end of the flexible circuit board 321 is electrically connected to a drive circuit board (not shown in the figure) of the rotatable camera module 314, and a second end of the flexible circuit board 321 is fixedly connected to one side of the connector 320 that is away from the main circuit board 318, so that the rotatable camera module 314 and the main circuit board 318 are electrically connected.

In this implementation, one end of the flexible heat conducting assembly 317 that is glued on one side is attached to a bottom of the reinforcement component, and the first end of the flexible heat conducting assembly 317 is bonded to the shielding cover 319. In this case, heat generated by an image sensor of the rotatable camera module 314 is conducted to the flexible circuit board 321 and the shielding cover 319 by using the flexible heat conducting assembly 317. In other words, the flexible heat conducting assembly 317, the flexible circuit board 321, and the shielding cover 319 form a heat conduction channel.

Sixth Implementation

Figure 36:
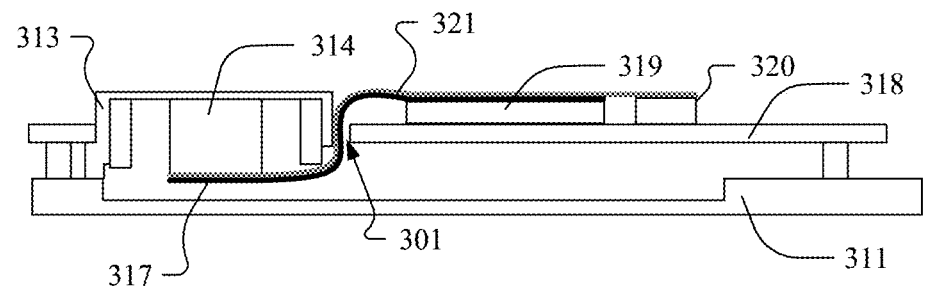
FIG. 36 is a schematic diagram of a partial structure of an electronic device according to a sixth implementation of this application.

A structure of an electronic device provided in the sixth implementation is approximately the same as the structure of the electronic device provided in the fifth implementation. FIG. 36 is a schematic diagram of a partial structure of an electronic device according to a sixth implementation of this application. A difference is that a shielding cover 319 and a connector 320 are disposed on one side of a main circuit board 318 that is away from a main mount 311, and the shielding cover 319 is located between the connector 320 and an auxiliary mount 313. There is a gap 301 between the auxiliary mount 313 and the main circuit board 318. A first end of a flexible circuit board 321 is fastened on a rotatable camera module 314, a flexible heat conducting assembly 317 is attached to one side of the flexible circuit board 321 that is away from the rotatable camera module 314, the first end of the flexible circuit board 321 is located between the rotatable camera module 314 and a first end of the flexible heat conducting assembly 317, the flexible circuit board 321 and the flexible heat conducting assembly 317 penetrate through the gap 301, a second end of the flexible circuit board 321 protrudes from the flexible heat conducting assembly 317 and is electrically connected to the connector 320, and a second end of the flexible heat conducting assembly 317 is fixedly connected to the shielding cover 319.

In this implementation, the flexible circuit board 321 is glued on two sides, the first end of the flexible circuit board 321 is attached to a bottom of a reinforcement component, the second end of the flexible circuit board 321 is attached to the connector 320, and the flexible circuit board 321 between the shielding cover 319 and the reinforcement component may be partially glued. In this case, heat generated by an image sensor of the rotatable camera module 314 is conducted to the flexible heat conducting assembly 317 and the shielding cover 319 by using the flexible circuit board 321. In other words, the flexible circuit board 321, the flexible heat conducting assembly 317, and the shielding cover 319 form a heat conduction channel.

Seventh Implementation

Figure 37:
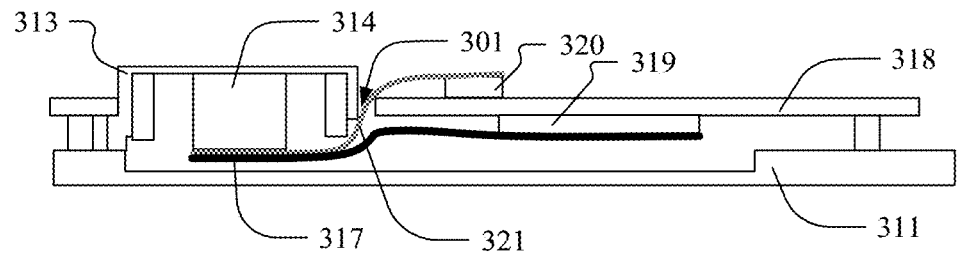
FIG. 37 is a schematic diagram of a partial structure of an electronic device according to a seventh implementation of this application.

A structure of an electronic device provided in the seventh implementation is approximately the same as the structure of the electronic device provided in the fifth implementation. FIG. 37 is a schematic diagram of a partial structure of an electronic device according to a seventh implementation of this application. A difference is that a shielding cover 319 and a connector 320 are respectively disposed on two sides of a main circuit board 318. The shielding cover 319 is located on one side of the main circuit board 318 that faces a main mount 311, and the connector 320 faces one side of the main circuit board 318 that is away from the main mount 311. A flexible heat conducting assembly 317 is partially attached to a flexible circuit board 321. One end of the flexible circuit board 321 is fastened between a bottom of a rotatable camera module 314 and the flexible heat conducting assembly 317, one end of the flexible circuit board 321 that is away from the rotatable camera module 314 is separated from the flexible heat conducting assembly 317 and penetrates through a gap 301, and one end of the flexible circuit board 321 that is away from the rotatable camera module 314 is fixedly connected to the connector 320. A first end of the flexible heat conducting assembly 317 is fixedly connected to one side of the flexible circuit board 321 that is away from the rotatable camera module 314, the flexible heat conducting assembly 317 extends from a bottom region of the rotatable camera module 314 towards a direction in which the shielding cover 319 is located, and a second end of the flexible heat conducting assembly 317 is fixedly connected to one side of the shielding cover 319 that is away from the main circuit board 318.

One end of the flexible heat conducting assembly 317 that is glued on one side is attached to the side of the flexible circuit board 321 that is away from the rotatable camera module 314, and one end is attached to the shielding cover 319. The flexible heat conducting assembly 317 between a reinforcement component and the shielding cover 319 may be partially glued, and heat generated by an image sensor of the rotatable camera module 314 is partially conducted to the flexible circuit board 321 and the shielding cover 319 by using the flexible heat conducting assembly 317. In other words, the flexible heat conducting assembly 317, the flexible circuit board 321, and the shielding cover 319 form a heat conduction channel.

Eighth Implementation

Figure 38:
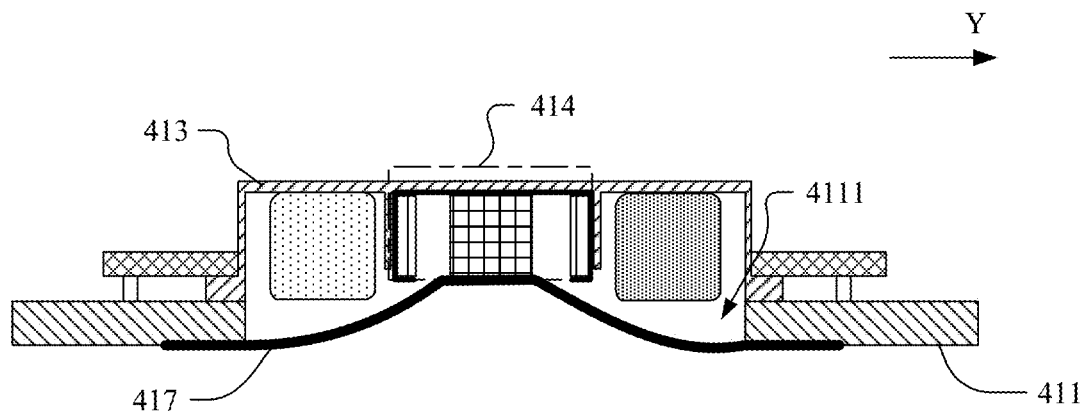
FIG. 38 is a schematic diagram of a partial structure of an electronic device according to an eighth implementation of this application.

A structure of an electronic device provided in the eighth implementation is approximately the same as the structure of the electronic device provided in the first implementation. FIG. 38 is a schematic diagram of a partial structure of an electronic device according to an eighth implementation of this application. A difference is that a concave part 4111 of a main mount 411 is a through hole. A flexible heat conducting assembly 417 penetrates through the concave part 4111, a first end of the flexible heat conducting assembly 417 is fixedly connected to one side of the main mount 411 that is away from an auxiliary mount 413, and a second end of the flexible heat conducting assembly 417 is fixedly connected to one side of the main mount 411 that is away from the auxiliary mount 413, so that heat generated by an image sensor of a rotatable camera module 414 is conducted to the main mount 411 by using the flexible heat conducting assembly 417. In this implementation, the flexible heat conducting assembly 417 is glued on one side, the first end of the flexible heat conducting assembly 417 is attached to a bottom of a reinforcement component of the rotatable camera module 414, and the other end is attached to the main mount 411.

Ninth Implementation

Figure 39:
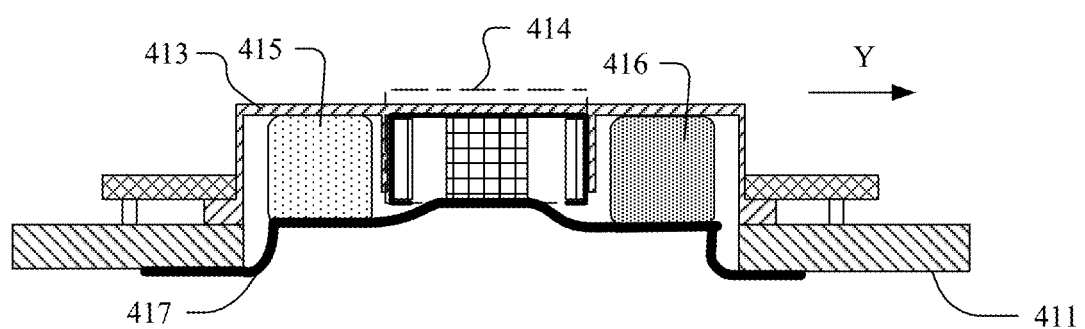
FIG. 39 is a schematic diagram of a partial structure of an electronic device according to a ninth implementation of this application.

A structure of an electronic device provided in the ninth implementation is approximately the same as the structure of the electronic device provided in the eighth implementation. FIG. 39 is a schematic diagram of a partial structure of an electronic device according to a ninth implementation of this application. A difference is that a flexible heat conducting assembly 417 is further connected to a bottom of a first fastened module 415, and the flexible heat conducting assembly 417 is further connected to a bottom of a second fastened module 416, so that heat generated by an image sensor of the rotatable camera module 414 is conducted to the first fastened module 415, the second fastened module 416, and the main mount 411 by using the flexible heat conducting assembly 417. The flexible heat conducting assembly 417 is glued on one side, the flexible heat conducting assembly 417 is partially attached to a bottom of a reinforcement component of the rotatable camera module 414, and the flexible heat conducting assembly 417 extends in a reverse direction and is attached to the bottom of the first fastened module 415, the bottom of the second fastened module 416, and one side of the main mount 411 that is away from the auxiliary mount 413.

Tenth Implementation

Figure 40:
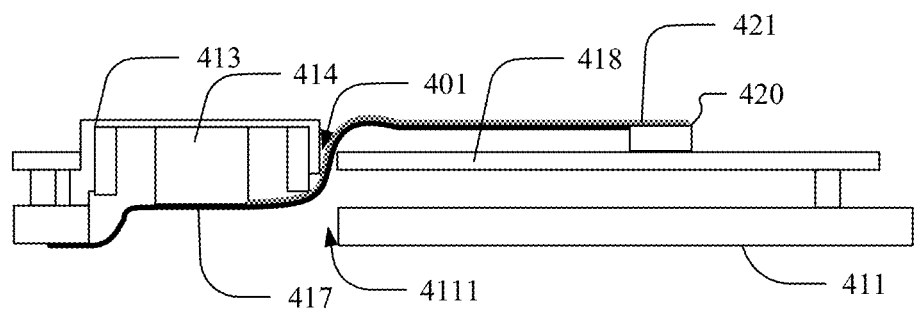
FIG. 40 is a schematic diagram of a partial structure of an electronic device according to a tenth implementation of this application.

A structure of an electronic device provided in the tenth implementation is approximately the same as the structure of the electronic device provided in the eighth implementation. FIG. 40 is a schematic diagram of a partial structure of an electronic device according to a tenth implementation of this application. A difference is that a first fastened module and a second fastened module are omitted from a camera assembly. There is a gap 401 between an auxiliary mount 413 and a main circuit board 418. The electronic device further includes a connector 420 and a flexible circuit board 421, and the connector 420 is fastened on one side that is of the main circuit board 418 and that is away from the main mount 411. A flexible heat conducting assembly 417 is attached to the flexible circuit board 421, a first end of the flexible heat conducting assembly 417 protrudes from the flexible circuit board 421 and is attached to one side that is of the main mount 411 and that is away from a rotatable camera module 414, the flexible heat conducting assembly 417 penetrates through a concave part 4111 and the gap 401, the flexible heat conducting assembly 417 is partially fixedly connected to a bottom of the camera module 414, and a second end of the flexible heat conducting assembly 417 extends to the connector 420.

A first end of the flexible circuit board 421 is fixedly and electrically connected to the bottom of the rotatable camera module 414, the flexible circuit board 421 penetrates through the gap 401 along with the flexible heat conducting assembly 417, and a second end of the flexible circuit board 421 is fixedly and electrically connected to the connector 420. The flexible heat conducting assembly 417, the main mount 411, and the flexible circuit board 421 form a heat conduction channel. Heat generated by an image sensor of the rotatable camera module 414 is partially conducted to the flexible circuit board 421 by using the flexible heat conducting assembly 417, and is partially conducted to the main mount 411.

It can be understood that, it only needs to be ensured that the second end of the flexible heat conducting assembly 417 extends to the connector 420 and is fixedly connected to the connector 420, so that the second end of the flexible circuit board 421 and the connector 420 can implement signal transmission.

Eleventh Implementation

Figure 41:
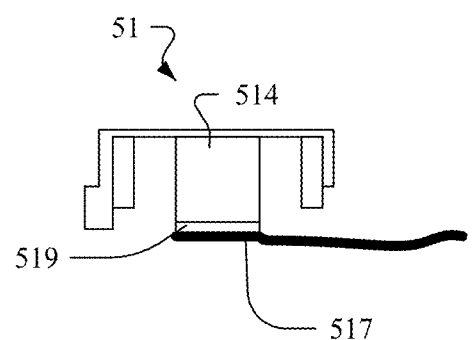
FIG. 41 is a schematic diagram of a partial structure of an electronic device according to an eleventh implementation of this application.

A structure of an electronic device provided in the eleventh implementation is approximately the same as the structure of the electronic device provided in the first implementation. FIG. 41 is a schematic diagram of a partial structure of an electronic device according to an eleventh implementation of this application. A difference is that a first fastened module and a second fastened module are omitted from a camera assembly 51. The camera assembly 51 further includes a thermoelectric cooler (TEC) 519. The thermoelectric cooler 519 is fastened between a rotatable camera module 514 and a flexible heat conducting assembly 517. A cold face of the thermoelectric cooler 519 is disposed adjacent to the rotatable camera module 514, and a hot face of the thermoelectric cooler 519 is disposed adjacent to the flexible heat conducting assembly 517. In this case, heat generated by the rotatable camera module 514 is absorbed by the cold face of the thermoelectric cooler 519, and is conducted to the flexible heat conducting assembly 517 by using the hot face of the thermoelectric cooler 519, to improve heat dissipation efficiency of the camera assembly 51. The thermoelectric cooler 519 is communicatively connected to a processor (not shown in the figure) of the electronic device.

The thermoelectric cooler is made based on a Peltier effect of a semiconductor material. The Peltier effect is a phenomenon in which one end absorbs heat while the other end discharges heat when a direct current flows through a galvanic couple including two semiconductor materials. Heavily doped N-type bismuth telluride and P-type bismuth telluride are mainly used as semiconductor materials in the TEC, and bismuth telluride elements are electrically connected in series and emit heat in parallel. The TEC includes some pairs (groups) of P-type bismuth telluride and N-type bismuth telluride, the pairs are connected together by using an electrode, and are sandwiched between two ceramic electrodes. When a current flows through the TEC, heat generated by the current is transferred from one side of the TEC to the other side, and a "hot" side and a "cold" side are generated on the TEC. This is a heating and cooling principle of the TEC.

In conclusion, the flexible heat conducting assembly is fastened at one end of a camera function group, and the flexible heat conducting assembly is further configured to be connected to a non-rotatable camera module component, so that when one end of the camera function group is suspended due to rotation, heat generated by the camera function group is transferred to the non-rotatable camera module component. The non-rotatable camera module component is a component other than the rotatable camera module, for example, another component such as an auxiliary mount, a main mount, a shielding cover, or a rear housing. A connection in "the flexible heat conducting assembly is further configured to be connected to a non-rotatable camera module component" may be a method of connection such as an attaching method or a contacting method. It only needs to be ensured that the flexible heat conducting assembly can transfer, to the non-rotatable camera module component, heat generated by the rotatable camera module.

The foregoing descriptions are merely examples of embodiments of the present invention, but are not intended to limit any form of the present invention. Although the examples of embodiments of the present invention are disclosed above, embodiments are not intended to limit the present invention. By using the method and the technical content disclosed above, any person of ordinary skill in the art can make a plurality of possible changes and modifications on the technical solutions of the present invention, or amend the technical solutions thereof to be embodiments with equal effects through equivalent variations without departing from the protection scope of the technical solutions of the present invention. Therefore, any simple modification, equivalent change, and modification made to the foregoing embodiments based on technical essence of the present invention without departing from content of the technical solutions of the present invention still fall within the protection scope of the technical solutions of the present invention.

What is claimed is:

1. A camera assembly, comprising:
   a rotatable camera module disposed on an auxiliary mount, and a flexible heat conducting assembly;
   wherein the rotatable camera module comprises a camera function group disposed on a rotatable mount rotatably connected to the auxiliary mount, the flexible heat conducting assembly is fixedly connected to one end of the camera function group, and the flexible heat conducting assembly is further configured to be connected to a non-rotatable camera module component to transfer heat generated by the camera function group to the non-rotatable camera module component.

2. The camera assembly according to claim 1, wherein the camera function group comprises a lens module, a drive component, a drive circuit board, a reinforcement component, and an image sensor, the lens module is disposed on the rotatable mount, the drive component is configured to drive the rotatable mount to rotate relative to the auxiliary mount, the drive circuit board is fastened at one end of the lens module, the image sensor is disposed on one side of the drive circuit board that faces the lens module, the reinforcement component is disposed on one side of the drive circuit board that faces away from the lens module, and the flexible heat conducting assembly is fixedly connected to the reinforcement component.

3. The camera assembly according to claim 1, wherein the auxiliary mount comprises a body and a partition part protruding from one side of the body, the body forms an accommodation space, the partition part partitions the accommodation space into a first accommodation part and a second accommodation part, the rotatable camera module is accommodated in the first accommodation part, and the camera assembly further comprises a fastened module fixedly accommodated in the second accommodation part, wherein the fastened module is a fastened camera module or an auxiliary camera module.

4. The camera assembly according to claim 1, wherein the flexible heat conducting assembly partially extends to a fastened module and is attached to the fastened module.

5. The camera assembly according to claim 1, wherein the flexible heat conducting assembly partially extends towards a partition part and is attached to the partition part.

6. The camera assembly according to claim 5, wherein the partition part comprises a first mounting section and a second mounting section, one end of the first mounting section is fixedly connected to a body, the second mounting section is formed by bending and extending the other end of the first mounting section and is fixedly connected to the body, the first accommodation part is surrounded by the body and the first mounting section, the second accommodation part is jointly surrounded by the body, the first mounting section, and the second mounting section, and the flexible heat conducting assembly is attached to the second mounting section.

7. The camera assembly according to claim 1, wherein the camera assembly further comprises a connector and a flexible circuit board, the flexible heat conducting assembly is attached to the flexible circuit board, one end of the flexible circuit board is electrically connected to the rotatable camera module, one end of the flexible circuit board that faces away from the rotatable camera module is fixedly and electrically connected to the connector, and the connector is configured to be fixedly and electrically connected to a main circuit board of an electronic device.

8. The camera assembly according to claim 7, wherein the flexible heat conducting assembly is partially exposed from the flexible circuit board, and is configured to be fixedly connected to a shielding cover of the main circuit board.

9. The camera assembly according to claim 1, wherein the flexible heat conducting assembly comprises a connected region that is disposed through a connection and a suspended region, the connected region is fixedly connected to the camera function group, and a part of the flexible heat conducting assembly that is located in the suspended region is a bent structure.

10. The camera assembly according to claim 9, wherein a stress groove is disposed on the flexible heat conducting assembly in the suspended region, and is used to cushion a stress generated when the flexible heat conducting assembly is pulled due to rotation of the camera function group.

11. The camera assembly according to claim 1, wherein the camera assembly further comprises a thermoelectric cooler fastened between the camera function group and the flexible heat conducting assembly, wherein a cold face of the thermoelectric cooler is disposed towards the camera function group, and a hot face of the thermoelectric cooler is disposed towards the flexible heat conducting assembly.

12. The camera assembly according to claim 1, wherein the end of the camera function group that is connected to the flexible heat conducting assembly is suspended when rotating relative to the auxiliary mount.

13. An electronic device, comprising:
a main circuit board fastened on a main mount, a camera assembly, an auxiliary mount fastened on the main mount and exposed from one side of the main circuit board that faces away from the main mount, and a camera function group electrically connected to the main circuit board;
wherein the camera assembly comprises
a rotatable camera module disposed on the auxiliary mount, and a flexible heat conducting assembly;
wherein the rotatable camera module comprises a rotatable mount and a camera function group disposed on the rotatable mount, the rotatable mount is rotatably connected to the auxiliary mount, the flexible heat conducting assembly is fixedly connected to one end of the camera function group, and the flexible heat conducting assembly is further configured to be connected to a non-rotatable camera module component, to transfer heat generated by the camera function group to the non-rotatable camera module component.

14. The electronic device according to claim 13, wherein the camera function group comprises a lens module, a drive component, a drive circuit board, a reinforcement component, and an image sensor, the lens module is disposed on the rotatable mount, the drive component is configured to drive the rotatable mount to rotate relative to the auxiliary mount, the drive circuit board is fastened at one end of the lens module, the image sensor is disposed on one side of the drive circuit board that faces the lens module, the reinforcement component is disposed on one side of the drive circuit board that faces away from the lens module, and the flexible heat conducting assembly is fixedly connected to the reinforcement component.

15. The electronic device according to claim 13, wherein the auxiliary mount comprises a body and a partition part protruding from one side of the body, the body forms an accommodation space, the partition part partitions the accommodation space into a first accommodation part and a second accommodation part, the rotatable camera module is accommodated in the first accommodation part, and the camera assembly further comprises a fastened module fixedly accommodated in the second accommodation part, wherein the fastened module is a fastened camera module or an auxiliary camera module.

16. The electronic device according to claim 13, wherein the flexible heat conducting assembly partially extends to a fastened module and is attached to the fastened module.

17. The electronic device according to claim 15, wherein the flexible heat conducting assembly partially extends towards the partition part and is attached to the partition part.

18. The electronic device according to claim 13, wherein the flexible heat conducting assembly partially extends towards the main mount and is attached to the main mount.

19. The electronic device according to claim 13, wherein a concave part is disposed on one side of the main mount that faces the auxiliary mount, and the concave part is disposed in alignment with the rotatable camera module.

20. The electronic device according to claim 19, wherein the concave part is a through hole, and the flexible heat conducting assembly penetrates through the concave part and is fixedly connected to the side of the main mount and faces away from the auxiliary mount.

* * * * *